United States Patent
Fukata et al.

(10) Patent No.: US 9,783,127 B2
(45) Date of Patent: Oct. 10, 2017

(54) THREE-DIMENSIONAL OBJECT DETECTION DEVICE

(71) Applicant: Nissan Motor Co., Ltd., Yokohama-shi, Kanagawa (JP)

(72) Inventors: Osamu Fukata, Sagamihara (JP); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 640 days.

(21) Appl. No.: 14/373,041

(22) PCT Filed: Feb. 13, 2013

(86) PCT No.: PCT/JP2013/053327
§ 371 (c)(1),
(2) Date: Jul. 18, 2014

(87) PCT Pub. No.: WO2013/125403
PCT Pub. Date: Aug. 29, 2013

(65) Prior Publication Data
US 2015/0054920 A1  Feb. 26, 2015

(30) Foreign Application Priority Data
Feb. 23, 2012 (JP) .................. 2012-037472

(51) Int. Cl.
*B60R 11/04* (2006.01)
*G06K 9/00* (2006.01)
(Continued)

(52) U.S. Cl.
CPC .......... *B60R 11/04* (2013.01); *G06K 9/00791* (2013.01); *G06K 9/00805* (2013.01);
(Continued)

(58) Field of Classification Search
CPC .................................. G06K 9/00805
See application file for complete search history.

(56) References Cited

U.S. PATENT DOCUMENTS

2010/0149333 A1   6/2010   Yang

FOREIGN PATENT DOCUMENTS

CN       102288165 A    12/2011
EP         2400315 A1   12/2011
(Continued)

OTHER PUBLICATIONS

Chin-Teng Lin et al, "Construction of Fisheye Lens Inverse Perspective Mapping Model and Its Applications of Obstacle Detection," EURASIP Journal on Advances in Signal Processing, Jun. 15, 2010, vol. 1, No. 3, 2010, Hindawi Publishing Corporation, New York, NY.

*Primary Examiner* — James Pontius
(74) *Attorney, Agent, or Firm* — Global IP Counselors, LLP

(57) ABSTRACT

A three-dimensional object detection device includes an image capturing unit, an image conversion unit, a three-dimensional object detection unit, a three-dimensional object assessment unit and a control unit. The image conversion unit converts a viewpoint of the images obtained by the image capturing unit to create bird's-eye view images. The three-dimensional object detection unit detects a presence of a three-dimensional object within the predetermined detection area by vehicle width direction detection processing. The three-dimensional object assessment unit assesses whether the three-dimensional object detected is another vehicle that is present within the predetermined detection area. The control unit suppresses assessment by the three-dimensional object assessment unit that the three-dimensional object is a vehicle when a specified detection position has moved rearward within the detection area in a host (Continued)

vehicle progress direction and arrived at a predetermined position in the host vehicle progress direction within the detection area.

13 Claims, 21 Drawing Sheets

(51) Int. Cl.
  *G08G 1/16* (2006.01)
  *G06K 9/32* (2006.01)
  *H04N 7/18* (2006.01)
  *H04N 13/02* (2006.01)
(52) U.S. Cl.
  CPC ........... *G06K 9/3241* (2013.01); *G08G 1/165* (2013.01); *G08G 1/166* (2013.01); *G08G 1/167* (2013.01); *H04N 7/183* (2013.01); *H04N 13/0203* (2013.01); *B60R 2300/107* (2013.01); *B60R 2300/304* (2013.01); *B60R 2300/607* (2013.01); *G06K 2209/23* (2013.01)

(56) References Cited

FOREIGN PATENT DOCUMENTS

| JP | 2002-298299 A | 10/2002 |
| JP | 2003-306102 A | 10/2003 |
| JP | 2006-79346 A | 3/2006 |
| JP | 2008-219063 A | 9/2008 |
| JP | 2008-227646 A | 9/2008 |
| JP | 2010-238053 A | 10/2010 |
| JP | 2012-3662 A | 1/2012 |

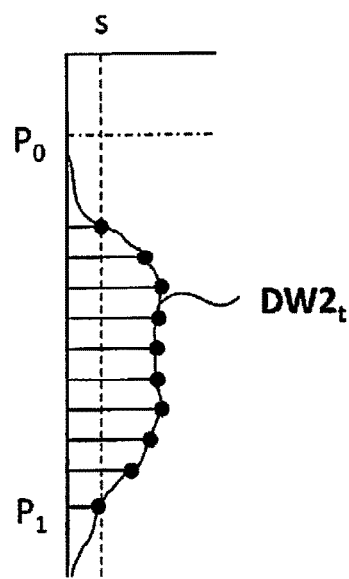 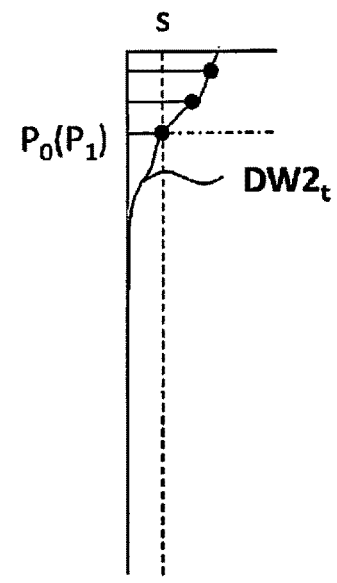
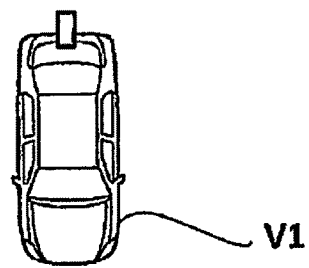 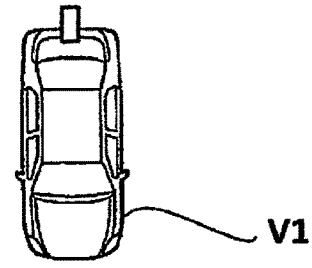
FIG. 11A             FIG. 11B

THREE-DIMENSIONAL OBJECT DETECTION DEVICE

CROSS-REFERENCE TO RELATED APPLICATIONS

This application is a U.S. National stage application of International Application No. PCT/JP2013/053327, filed Feb. 13, 2013, which claims priority to Japanese Patent Application No. 2012-037472 filed in Japan on Feb. 23, 2012. The entire disclosure of Japanese Patent Application No. 2012-037472 is hereby incorporated herein by reference.

BACKGROUND

Field of the Invention

The present invention relates to a three-dimensional object detection device.

Background Information

In a conventionally known technique, two captured images captured at different times are converted to a bird's-eye view image, and an obstacle is detected based on differences in the two converted bird's-eye view images (see Japanese Laid-Open Patent Application No. 2008-227646).

SUMMARY

When another vehicle present in an adjacent lane rearward of the host vehicle has been detected based on a captured image that has captured the rearward of the host vehicle, there is a problem in that another vehicle that has been passed by the host vehicle will be detected as the other vehicle to be detected.

The problem to be solved by the present invention is to provide a three-dimensional object detection device that effectively prevents another vehicle that has been passed by the host vehicle from being detected as the other vehicle to be detected, and that is capable of detecting with high precision the other vehicle to be detected.

The present invention solves the problem by aligning on a bird's-eye view the positions of bird's-eye view images obtained at different times, counting a number of pixels that indicate a predetermined difference in a difference image of the aligned bird's-eye view images, specifying a detection position for which a count number equal to or greater than a predetermined value has been obtained, and suppressing assessment that the detected three-dimensional object is another vehicle to be detected when the specified detection position has moved within the detection area from the front toward the back in a host vehicle progress direction and arrived at a predetermined position within the detection area.

In accordance with the present invention, counting the number of pixels, which indicates predetermined image information, along the vehicle width direction makes it possible to detect the position of the front bumper of another vehicle in the detection area, and to suitably assess whether the host vehicle has passed another vehicle in accordance with the position of the front bumper of the other vehicle. Therefore, it is possible to effectively prevent another vehicle that has been passed by the host vehicle from being detected as the other vehicle to be detected, and to detect with high precision the other vehicle to be detected.

BRIEF DESCRIPTION OF THE DRAWINGS

Referring now to the attached drawings which form a part of this original disclosure.

FIGS. 11(A) and 11(B) are views for describing the passing assessment method carried out by the three-dimensional object detection unit.

DETAILED DESCRIPTION OF THE EMBODIMENTS

Figure 1:
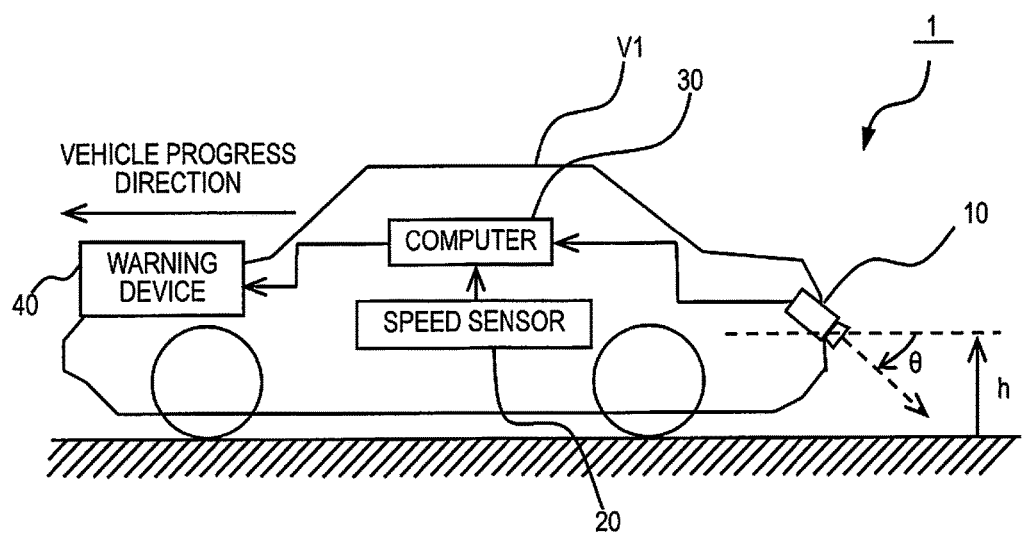
FIG. 1 is a schematic overview of a vehicle in which a three-dimensional object detection device has been mounted.

FIG. 1 is a schematic overview of a vehicle in which a three-dimensional object detection device 1 according to the present embodiment has been mounted. An object of the three-dimensional object detection device 1 according to the present embodiment is to detect another vehicle (may hereinbelow be referred to as "adjacent vehicle") present in an adjacent lane where contact is possible should a host vehicle V1 change lanes. The three-dimensional object detection device 1 according to the present embodiment is provided with a camera 10, a speed sensor 20, a computer 30, and a warning device 40, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle. The warning device 40 warns a driver of the host vehicle V1 when there is a possibility that the adjacent vehicle detected by the computer 30 will contact the host vehicle V1.

Figure 2:
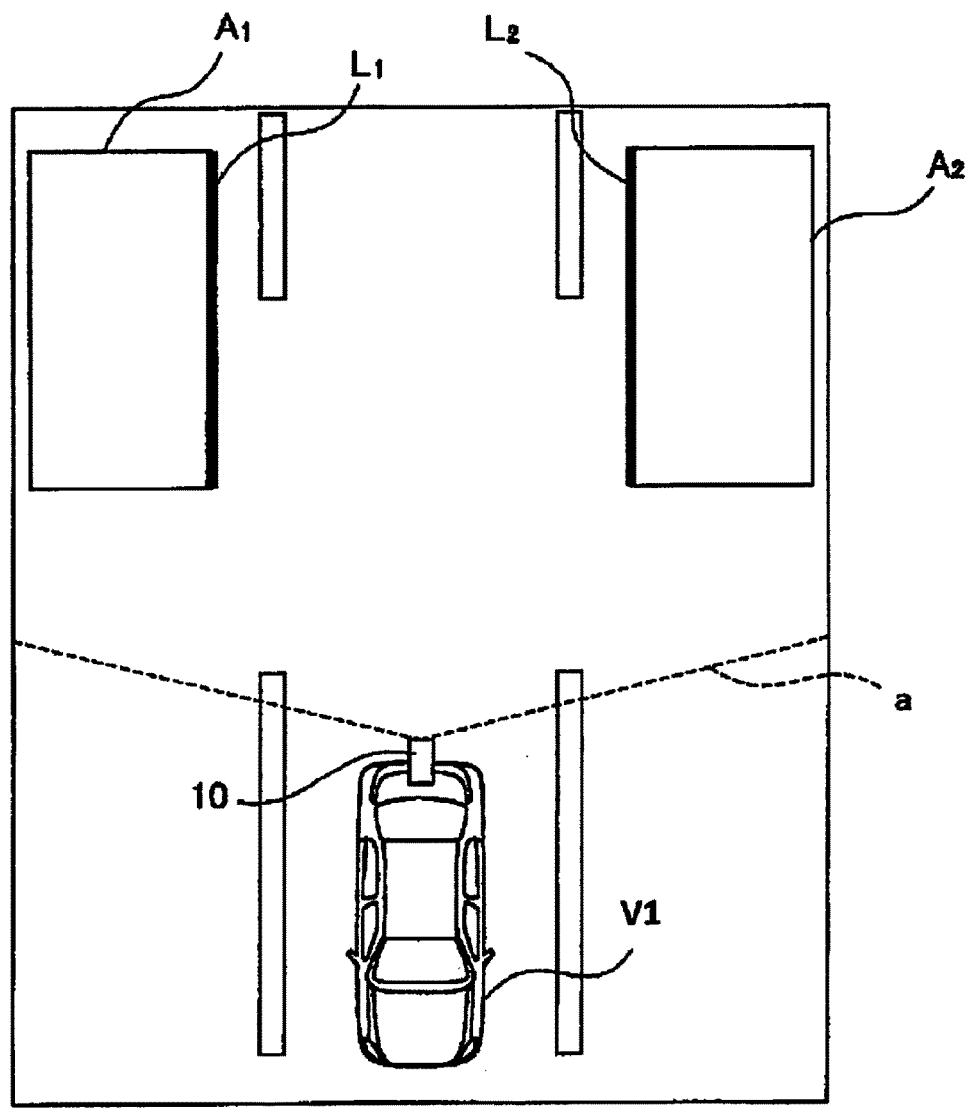
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
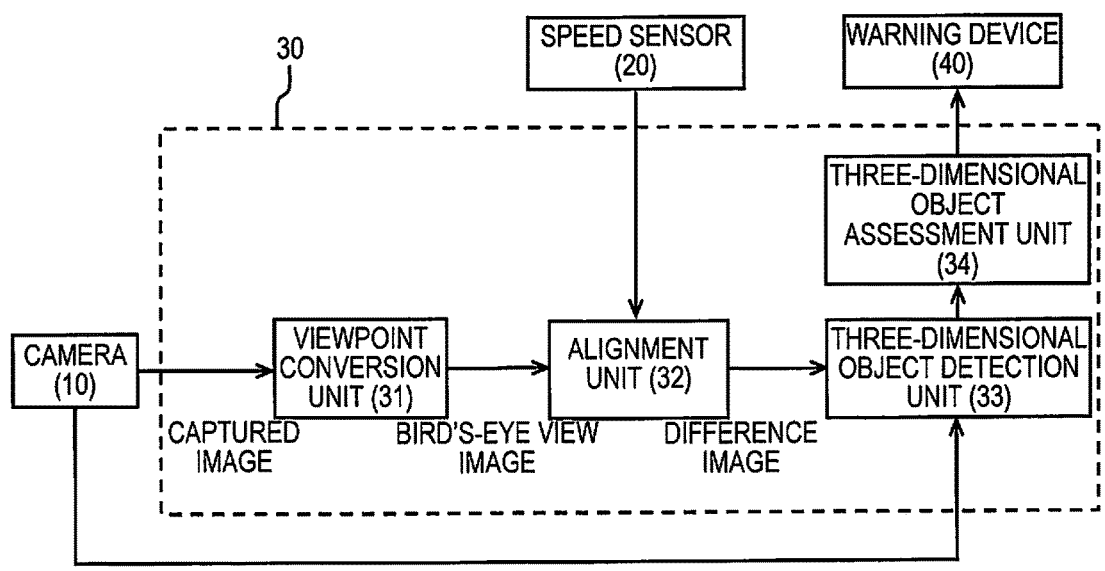
FIG. 3 is a block diagram illustrating the details of the computer according to the first embodiment.

FIG. 3 is a block view illustrating the details of the computer 30 according to the first embodiment. The camera 10, the speed sensor 20, and the warning device 40 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, and a three-dimensional object assessment unit 34. The configurations of these units are described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
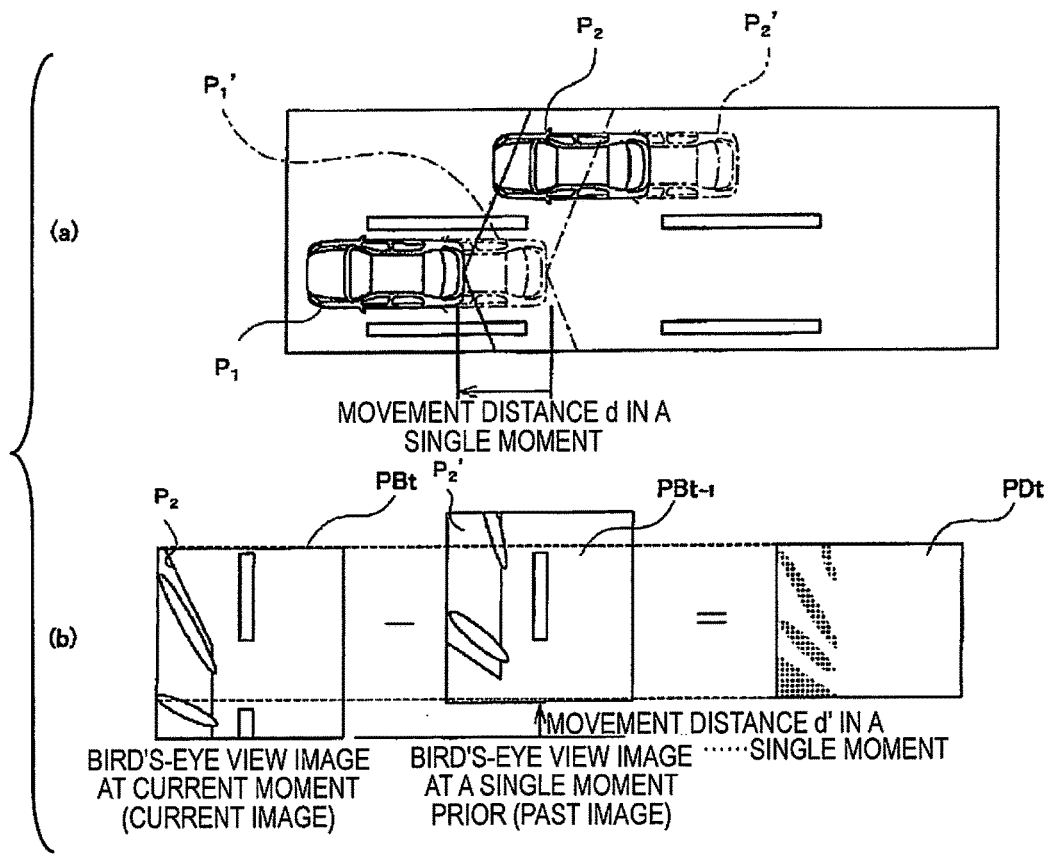
FIG. 4 is a view for describing the general overview of the processing of the alignment unit, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) illustrating the movement state of the host vehicle V1 from a top plan view, and part (b) illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in actual space. The three-dimensional object detection unit 33 first generates a first difference waveform $DW1_t$ when the three-dimensional object is detected and the movement distance is to be calculated.

In generating the first difference waveform $DW1_t$, the three-dimensional object detection unit 33 sets a detection area in the difference image $PD_t$. An object of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set behind the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
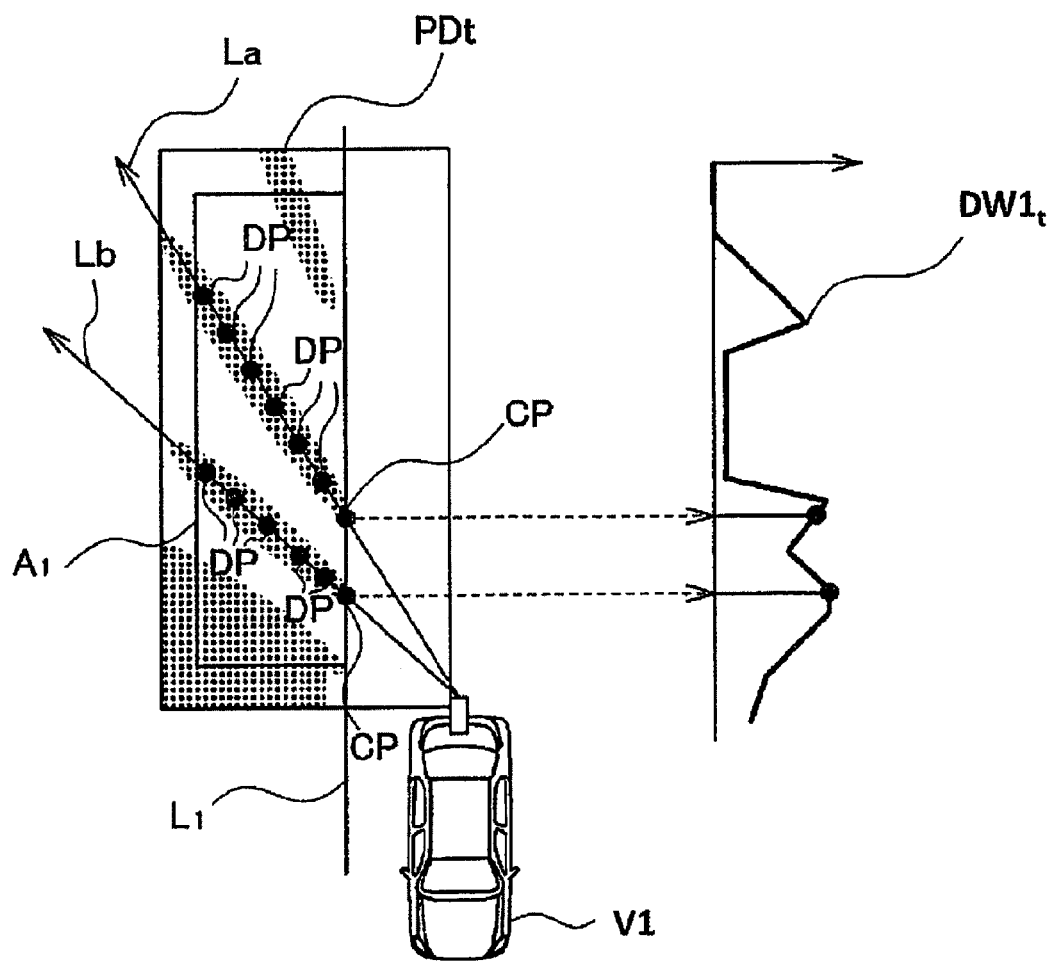
FIG. 5 is a schematic view illustrating the manner in which the first difference waveform is generated by the three-dimensional object detection unit.

FIG. 5 is a schematic view illustrating the manner in which the first difference waveform $DW1_t$ is generated by the three-dimensional object detection unit 33. As illustrated in FIG. 5, the three-dimensional object detection unit 33 generates a first difference waveform $DW1_t$ from the portion that corresponds to the detection areas A1, A2 in the difference image $PD_t$ (drawing on the right in part (b) of FIG. 4) calculated by the alignment unit 32. In this case, the three-dimensional object detection unit 33 generates a first difference waveform $DW1_t$ along the collapsing direction of the three-dimensional object by viewpoint conversion. In the example illustrated in FIG. 5, only the detection area A1 will be described for the sake of convenience, but the first difference waveform $DW1_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP, and thereafter determines the crossing point CP of the line La and the ground line L1.

The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a first difference waveform $DW1_t$ as illustrated in the drawing on the right in FIG. 5.

Here, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a first difference waveform $DW1_t$. In particular, the number of pixels is counted along the direction in which the three-dimensional object collapses, and a first difference waveform $DW1_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the first difference waveform $DW1_t$ that correspond to the lines La, Lb in the direction in which the three-dimensional object collapses are thereby made substantially the same.

After the first difference waveform $DW1_t$ has been generated, the three-dimensional object detection unit 33 calculates the movement distance by comparing the first difference waveform $DW1_t$ at the current moment and the first difference waveform $DW1_{t-1}$ at a single moment prior. In other words, the three-dimensional object detection unit 33 calculates the movement distance from the change in time of the first difference waveform $DW1_t$ and the first difference waveform $DW1_{t-1}$.

Figure 6:
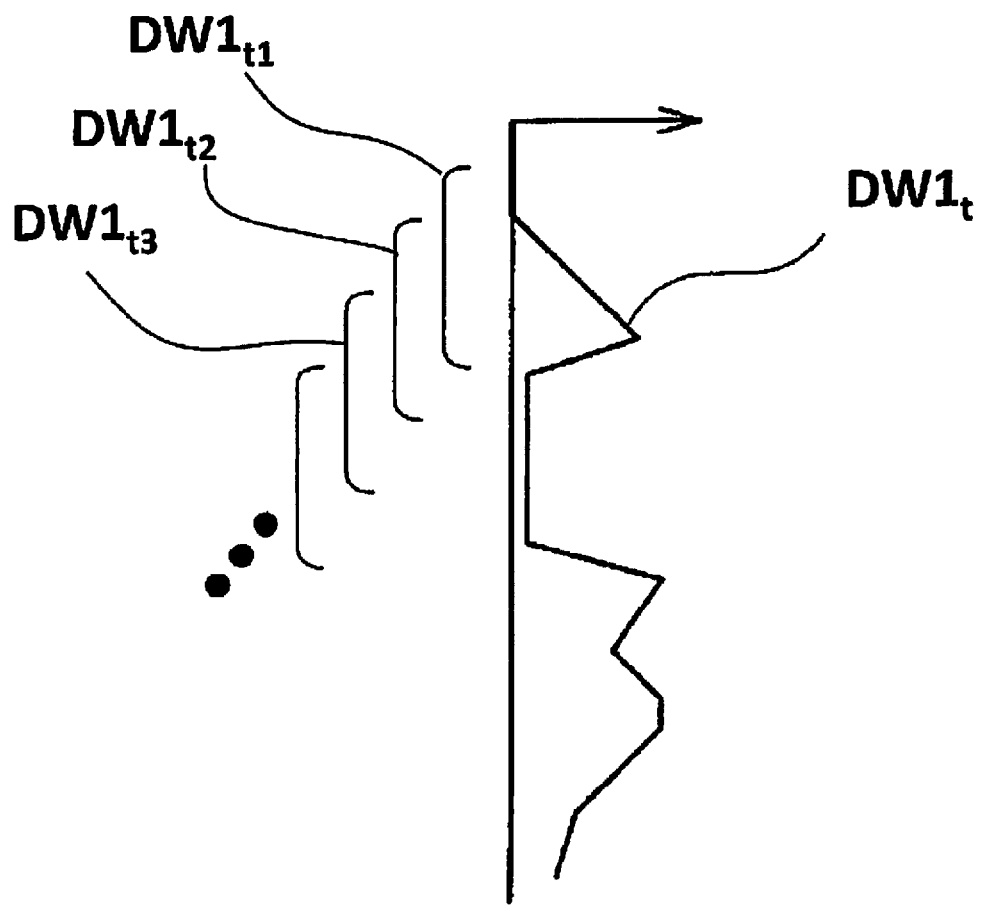
FIG. 6 is a view illustrating the small areas divided by the three-dimensional object detection unit.

More specifically, the three-dimensional object detection unit 33 divides the first difference waveform $DW1_t$ into a plurality of small areas $DW1_{t1}$ to $DW1_{tn}$ (where n is an arbitrary integer of 2 or greater), as illustrated in FIG. 6. FIG. 6 is a view illustrating the small areas $DW1_{t1}$ to $DW1_m$ divided by the three-dimensional object detection unit 33. The small areas $DW1_{t1}$ to $DW1_m$ are divided so as to be mutually overlapping, as illustrated in, e.g., FIG. 6. For example, the small area $DW1_{t1}$ and the small area $DW1_{t2}$ overlap each other, and the small area $DW1_{t2}$ and the small area $DW1_{t3}$ overlap each other.

Next, the three-dimensional object detection unit 33 determines the offset amount (the amount of movement in the horizontal-axis direction (vertical direction in FIG. 6) of the difference waveform) for each of the small areas $DW1_{t1}$ to $DW1_m$. Here, the offset amount is determined from the difference (distance in the horizontal-axis direction) between the first difference waveform $DW1_{t-1}$ at a single moment prior and the first difference waveform $DW1_t$ at the current moment. In this case, the three-dimensional object detection unit 33 moves the first difference waveform $DW1_{t-1}$ at a single moment prior in the horizontal-axis direction for each of the small areas $DW1_{t1}$ to $DW1_{tm}$, and thereupon assesses the position (the position in the horizontal-axis direction) in which the error from the first difference waveform $DW1_t$ at the current moment is at a minimum, and determines as the offset amount the movement amount in the horizontal-axis direction at the position in which the error from the original position of the first difference waveform $DW1_{t-1}$ is at a minimum. The three-dimensional object detection unit 33 then counts the offset amount determined for each of the small areas $DW1_{t1}$ to $DW1_m$ and forms a histogram.

Figure 7:
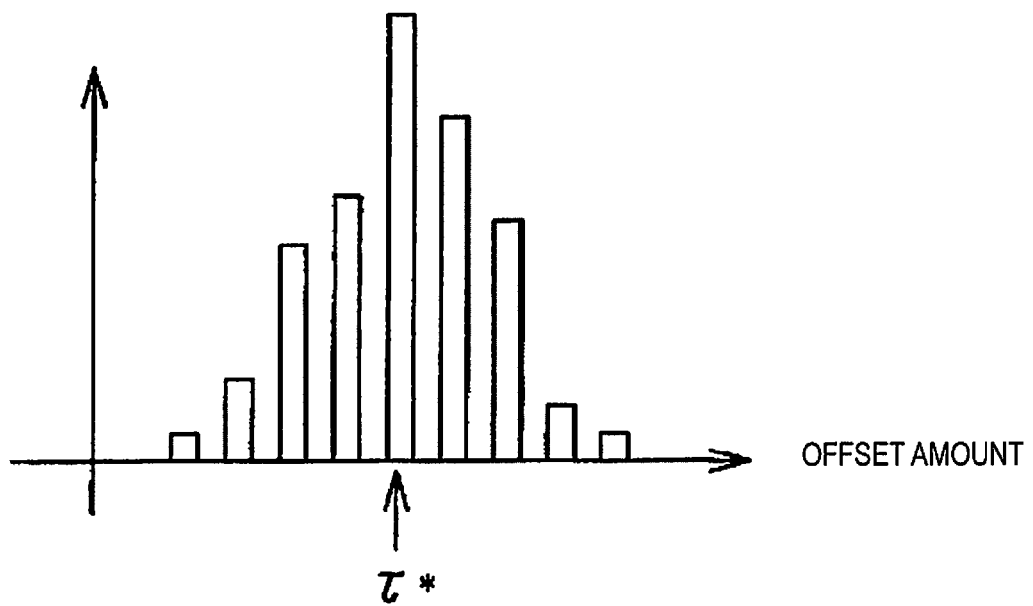
FIG. 7 is a view illustrating an example of the histogram obtained by the three-dimensional object detection unit.

FIG. 7 is a view illustrating an example of the histogram obtained by the three-dimensional object detection unit 33. As illustrated in FIG. 7, some amount of variability occurs in the offset amount, which is the movement distance in which the error between the small areas $DW1_{t1}$ to $DW1_m$ and the first difference waveform $DW1_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 7, the three-dimensional object detection unit 33 calculates the offset amount indicating the maximum value of the histogram as the movement distance $\tau^*$. In this manner, in the present embodiment, a more highly accurate movement distance can be calculated from the maximum value, even when there is variability in the offset amount. The movement distance $\tau^*$ is the relative movement distance of the three-dimensional object in relation to the host vehicle. Accordingly, the three-dimensional object detection unit 33 calculates the absolute movement distance based on the movement distance $\tau^*$ thus obtained and the speed sensor 20 when the absolute movement distance is to be calculated.

In this manner, in the present embodiment, the movement distance of the three-dimensional object is calculated from the offset amount of the first difference waveform $DW1_t$ when the error in the first difference waveform $DW1_t$ generated at different moments is at a minimum, and this allows the movement distance to be calculated from the offset amount, which is information about one dimension in a waveform, and allows computation cost to be kept low when the movement distance is calculated. Also, dividing the first difference waveform $DW1_t$ generated at different moments into a plurality of small areas $DW1_{t1}$ to $DW1_m$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the first difference waveform $DW1_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 8:
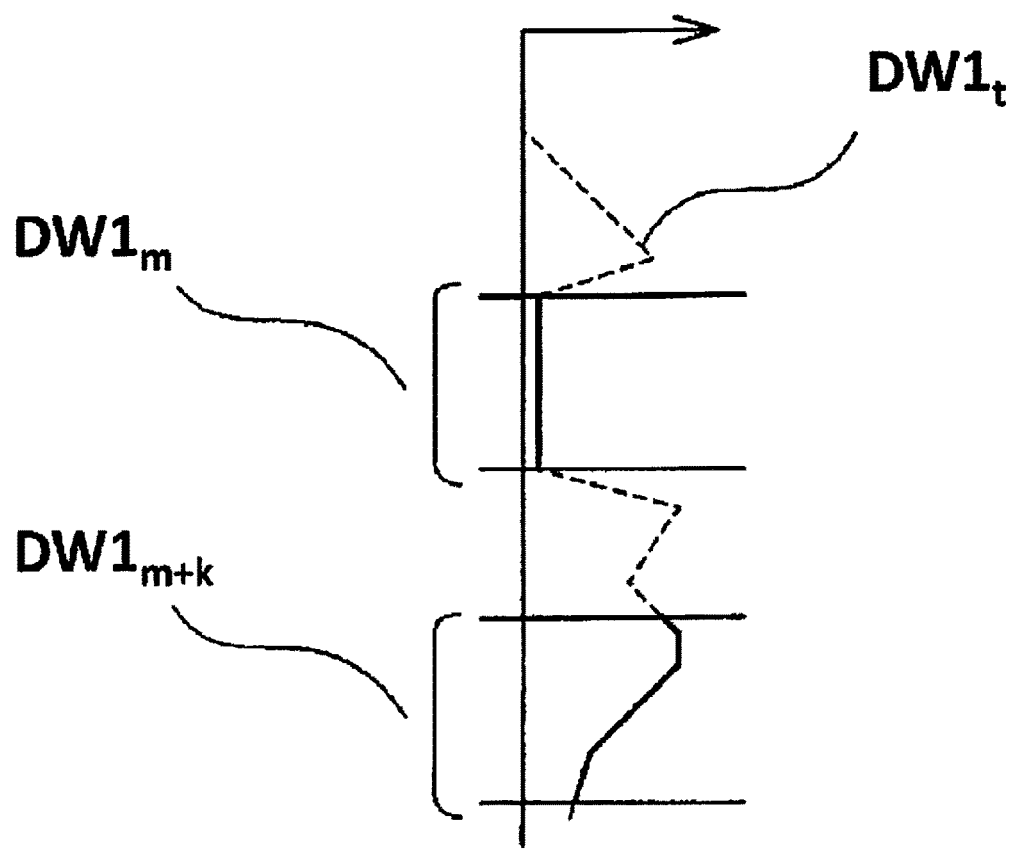
FIG. 8 is a view illustrating the weighting used by the three-dimensional object detection unit.

When a histogram is to be formed, the three-dimensional object detection unit 33 may impart a weighting to the plurality of small areas $DW1_{t1}$ to $DW1_{tm}$, and count the offset amounts determined for each of the small areas $DW1_{t1}$ to $DW1_m$ in accordance with the weighting to form a histogram. FIG. 8 is a view illustrating the weighting used by the three-dimensional object detection unit 33.

As illustrated in FIG. 8, a small area $DW1_m$ (where m is an integer 1 or greater and n−1 or less) is flat. In other words, in the small area $DW1_m$, there is little difference between the maximum and minimum values of the count of number of pixels indicating a predetermined difference. The three-dimensional object detection unit 33 reduces the weighting of this type of small area $DW1_m$. This is because the flat small area $DW1_m$ lacks a characteristic and there is a high possibility that an error will be magnified when the offset amount is calculated.

On the other hand, a small area $DW1_{m+k}$ (where k is an integer n-m or less) has abundant undulation. In other words, in the small area $DW1_{m+k}$, there is considerable difference between the maximum and minimum values of the count of number of pixels indicating a predetermined difference. The three-dimensional object detection unit 33 increases the weighting of this type of small area $DW1_{m+k}$. This is because the small area $DW1_{m+k}$ abundant in undulation is characteristic and there is a high possibility that the offset amount will be accurately calculated. Weighting the small areas in this manner makes it possible to enhance the precision for calculating the movement distance.

The first difference waveform $DW1_t$ is divided into a plurality of small areas $DW1_{t1}$ to $DW1_m$ in the present embodiment in order to enhance the precision for calculating the movement distance, but division into the small areas $DW1_{t1}$ to $DW1_m$ is not required when the precision for calculating movement distance is not so needed. In this case, the three-dimensional object detection unit 33 calculates the movement distance from the offset amount of the first difference waveform $DW1_t$ when the error between the first difference waveform $DW1_t$ and the first difference waveform $DW1_{t-1}$ is at a minimum. In other words, the method for determining the offset amount between the first difference waveform $DW1_{t-1}$ at a single moment prior and the first difference waveform $DW1_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the three-dimensional object.

Figure 9:
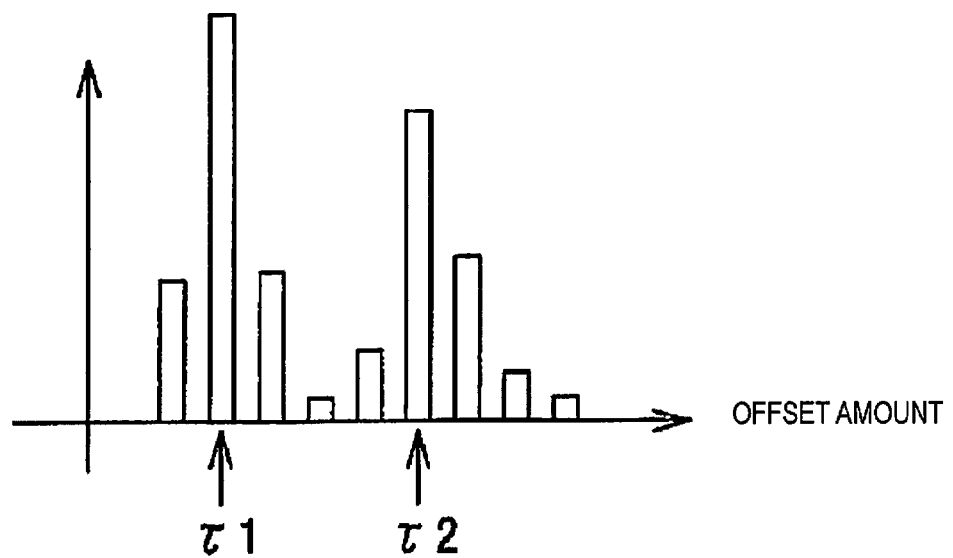
FIG. 9 is a view illustrating another example of the histogram obtained by the three-dimensional object detection unit.

FIG. 9 is a view illustrating another example of the histogram obtained by the three-dimensional object detection unit 33. When a stationary object other than the three-dimensional object is present within the view angle of the camera 10, two maximum values $\tau 1$, $\tau 2$ appear in the resulting histogram. In this case, one of the two maximum values $\tau 1$, $\tau 2$ is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible to prevent a situation in which an errant movement distance is calculated such as when there is a plurality of maximum values.

Figure 10:
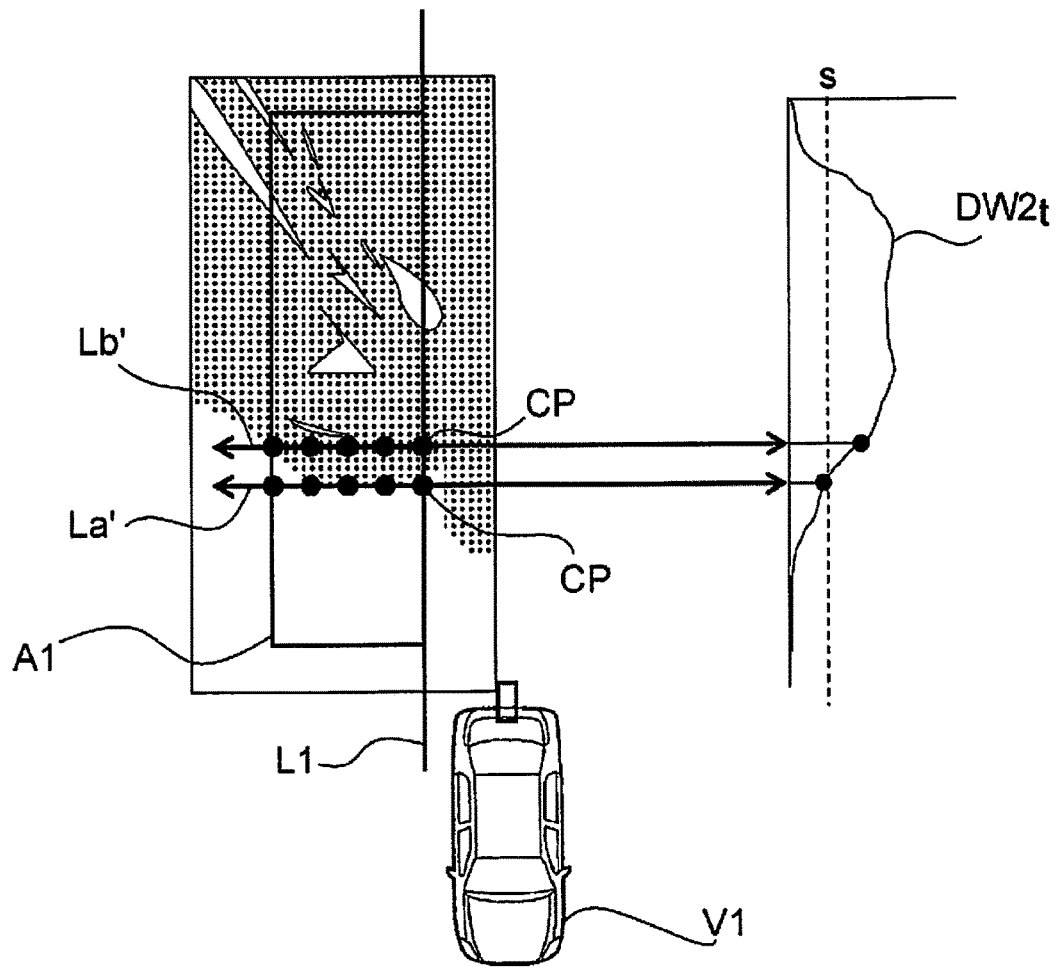
FIG. 10 is a schematic view illustrating the manner in which the second difference waveform is generated by the three-dimensional object detection unit.

The three-dimensional object detection unit 33 generates a second difference waveform $DW2_t$ along the vehicle width direction from the portion that corresponds to the detection areas A1, A2 within the difference image $PD_t$ (drawing on the right side in FIG. 4(*b*)) calculated by the alignment unit 32. FIG. 10 is a schematic view illustrating the manner in which the second difference waveform $DW2_t$ is generated by the three-dimensional object detection unit 33. As illustrated in FIG. 10, the three-dimensional object detection unit 33 generates the second difference waveform $DW2_t$ along the vehicle width direction. In the example illustrated in FIG. 10, only the detection area A1 will be described for the sake of convenience, but the second difference waveform $DW2_t$ is generated for the detection area A2 as well using the same procedure.

More specifically, first, the three-dimensional object detection unit 33 defines a line La' in the vehicle width direction in the difference image $PD_t$ data. The three-dimensional object detection unit 33 then counts the number of difference pixels DP indicating a predetermined difference on the line La'.

The three-dimensional object detection unit 33 counts the number of difference pixels DP, and thereafter determines the crossing point CP of the line La' and the ground line L1. The three-dimensional object detection unit 33 then correlates the crossing point CP and the count number, decides horizontal-axis position, i.e., the position on the axis in the vertical direction in the drawing on the right in FIG. 10, based on the position of the crossing point CP, decides the vertical-axis position, i.e., the position on the axis in the lateral direction in the drawing on the right in FIG. 10, from the count number, and plots the positions as the count number at the crossing point CP.

Similarly, the three-dimensional object detection unit 33 defines the lines Lb', Lc', . . . in the vehicle width direction, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a second difference waveform $DW2_t$ as illustrated in the drawing on the right in FIG. 10. In this manner, in the present embodiment, the difference pixels DP are counted in the vehicle width direction, thereby making it possible to detect the front bumper of an adjacent vehicle that is present at the same height position in real space.

Thus, the second difference waveform $DW2_t$ is a mode of distributed information of pixels that indicate a predetermined difference in luminance, and the "distributed information of pixels" in the present embodiment can be positioned with information indicating the state of distribution of "pixels having a difference in luminance that is equal to or greater than a predetermined threshold value" detected along the vehicle width direction. In other words, the three-dimensional object detection unit 33 detects a three-dimensional object based on the distributed information of pixels having a difference in luminance that is equal to or greater than a predetermined threshold value along the vehicle width direction in the bird's-eye view image obtained by the viewpoint conversion unit 31.

The three-dimensional object assessment unit 34 illustrated in FIG. 3 determines whether the host vehicle has passed an adjacent vehicle traveling in an adjacent lane based on the second difference waveform $DW2_t$ generated by the three-dimensional object detection unit 33. When determining whether the host vehicle has passed the adjacent vehicle, first, the three-dimensional object assessment unit 34 determines whether an adjacent vehicle is present in an adjacent lane based on the second difference waveform $DW2_t$. Specifically, the three-dimensional object assessment unit 34 detects the number of detection positions in which the count number of the difference pixels DP is equal to or greater than a threshold value s based on the second difference waveform $DW2_t$, and determines that an adjacent vehicle is present in an adjacent lane when a predetermined number of detection positions or greater having a count number equal to or greater than the threshold value s has been detected in continuous fashion. The predetermined number is not particularly limited and may be set, as appropriate, by experimentation or other means so that an adjacent vehicle can be determined based on the number of detection positions. The configuration is not limited to that described above, and it is also possible to use a configuration in which an adjacent vehicle is determined to be present in an adjacent lane when, e.g., the detection positions having a count number equal to or greater than the threshold value s have been detected in continuous fashion for a predetermined width or greater that allows the adjacent vehicle to be assessed.

The three-dimensional object assessment unit 34 determines whether the detection position nearest to the host vehicle among the detection positions, for which the count number of the difference pixels DP is equal to or greater than the threshold value s, has arrived at a predetermined position $P_0$ within the detection area A1, and thereby determines whether the host vehicle has passed the adjacent vehicle. Here, as described above, counting the difference pixels DP in the vehicle width direction allows the front bumper of adjacent vehicles present in the detection areas A1, A2 to be detected, whereby the position of the front bumper of the adjacent vehicles in the detection areas A1, A2 can detected. Accordingly, when the detection position nearest to the host vehicle among the detection positions, for which the count number is equal to or greater than the threshold value s, has arrived at the predetermined position $P_0$ within the detection area A1, the three-dimensional object assessment unit 34 determines that the adjacent vehicle (the position of the front bumper of the adjacent vehicle) is positioned far away to the back of the host vehicle and the host vehicle has passed the adjacent vehicle, determines that an adjacent vehicle with which the host vehicle may possibly make contact should a lane change be made is not present, and assesses that the adjacent vehicle to be detected, i.e., the adjacent vehicle with which the host vehicle may possibly make contact should a lane change be made, is not present in the adjacent lane.

For example, in the example illustrated in FIG. 11A, the three-dimensional object assessment unit 34 determines that an adjacent vehicle, with which the host vehicle may possibly make contact should a lane change be made, is present in the adjacent lane because the detection position $P_1$ nearest to the host vehicle among the detection positions, for which the count number is equal to or greater than the threshold value s, has not arrived at a predetermined position $P_0$ within the detection area, and assesses that an adjacent vehicle to be detected is not present in the adjacent lane. On the other hand, in the example illustrated in FIG. 11B, the three-dimensional object assessment unit 34 determines that an adjacent vehicle, with which the host vehicle may possibly make contact when a lane change has been made, is present because the detection position $P_1$ nearest to the host vehicle among the detection positions for which the count number is equal to or greater than the threshold value s has arrived at the predetermined position $P_0$ within the detection area, and assesses that an adjacent vehicle to be detected is present in the adjacent lane.

The position of the predetermined position $P_0$ illustrated in FIGS. 11A and 11B is not particularly limited, and the position of the predetermined position $P_0$ may be, e.g., a position nearer to the host vehicle than the predetermined position $P_0$ illustrated in FIGS. 11A and 11B, or the position of the predetermined position $P_0$ may be a position farther away from the host vehicle than the predetermined position $P_0$ illustrated in FIGS. 11A and 11B.

Figure 12:
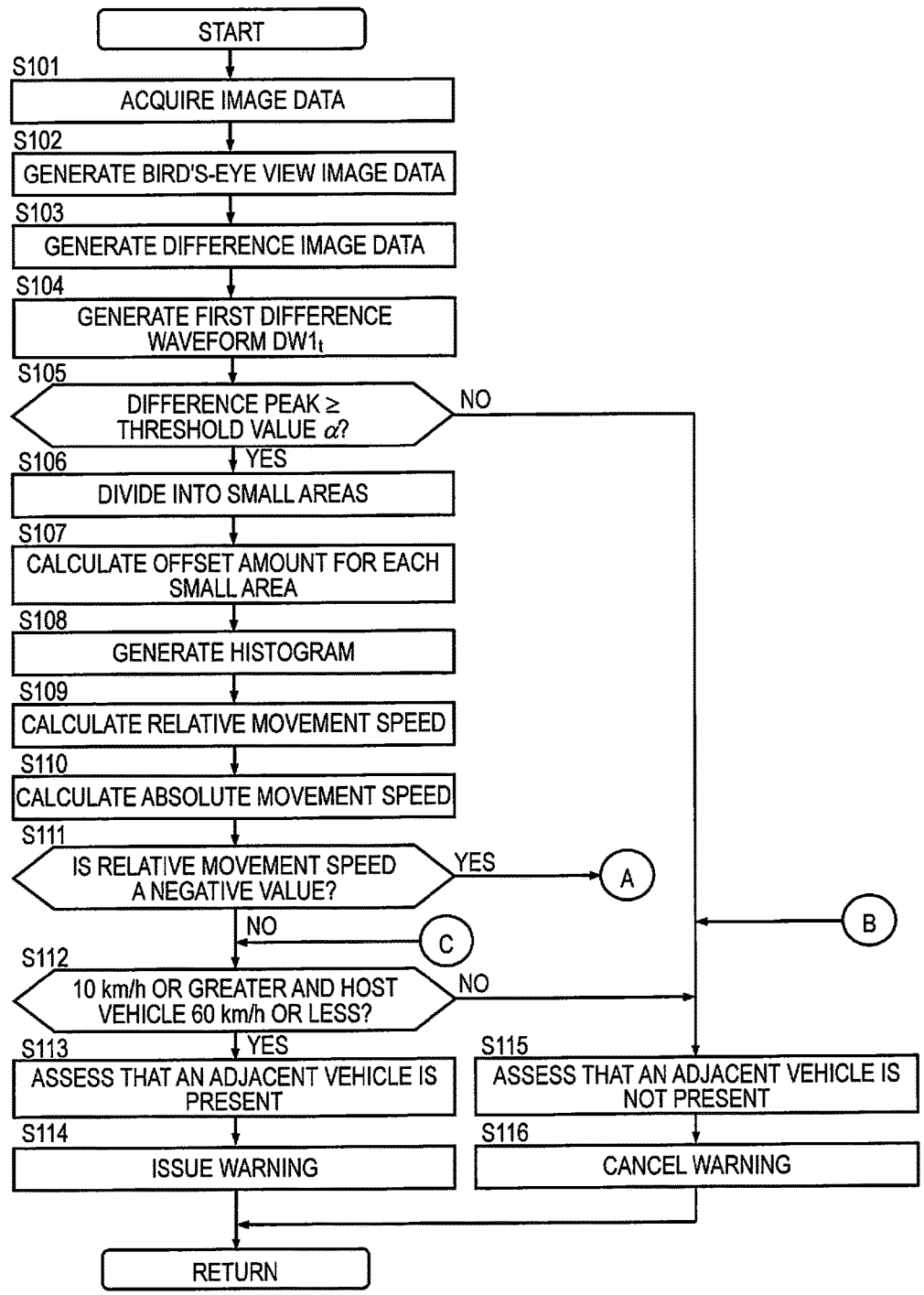
FIG. 12 is a first part of a flowchart illustrating the method for detecting an adjacent vehicle according to the first embodiment.
Figure 13:
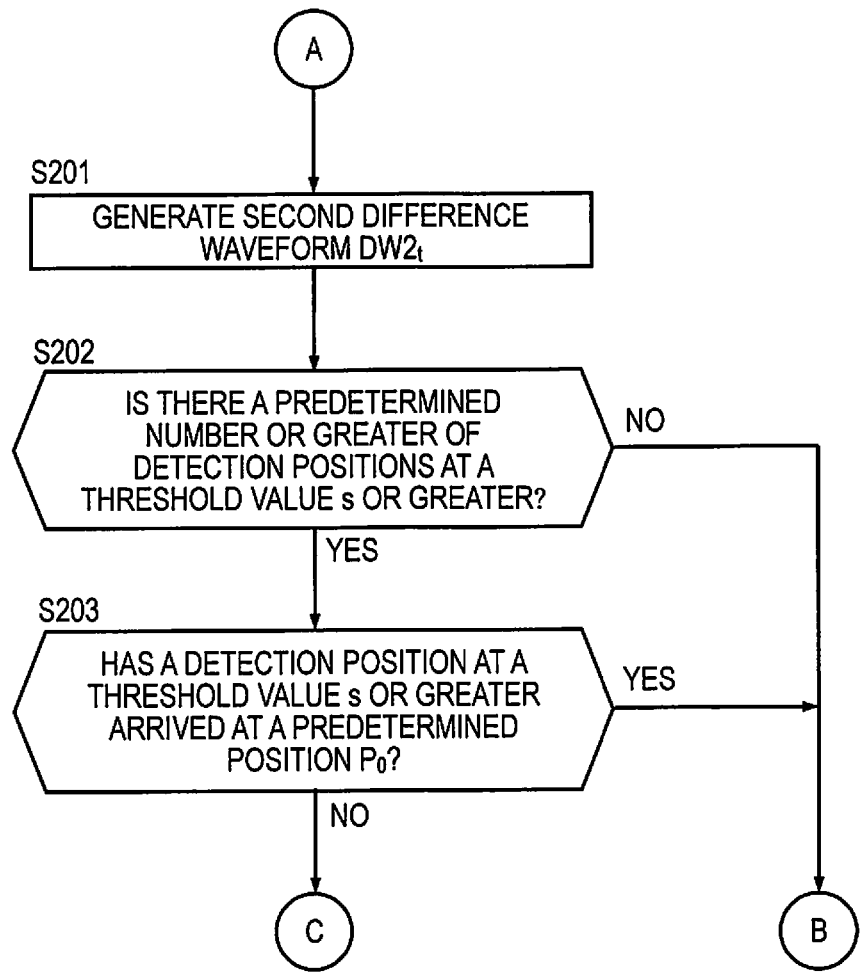
FIG. 13 is a second part of a flowchart illustrating the method for detecting an adjacent vehicle according to the first embodiment.

Described next is the process for detecting an adjacent vehicle in accordance with the present embodiment. FIGS. 12 and 13 are flowcharts illustrating processes for detecting an adjacent vehicle according to the present embodiment. First, data of a captured image P is acquired by the computer 30 from the camera 10 (step S101), and data of a bird's-eye view image $PB_t$ is generated (step S102) based on the data of the captured image P thus acquired, as illustrated in FIG. 12.

The alignment unit 32 aligns the bird's-eye view image $PB_t$ data and the bird's-eye view image $PB_{t-1}$ data at a single moment prior, and generates difference image $PD_t$ data (step S103). The three-dimensional object detection unit 33 then counts the number of difference pixels DP having a pixel value of "1" along the direction in which the three-dimensional object collapses due to viewpoint conversion to thereby generate a first difference waveform $DW1_t$ from the difference image $PD_t$ data (step S104).

When the first difference waveform $DW1_t$ has been generated, the three-dimensional object assessment unit 34 determines whether a peak in the first difference waveform $DW1_t$ is at a predetermined threshold value α or greater (step S105). When the peak of the first difference waveform $DW1_t$ is not at the threshold value α or greater, i.e., when there is essentially no difference, it is thought that a three-dimensional object is not present in the captured image P. Accordingly, when it has been determined that the peak of the first difference waveform $DW1_t$ is not at the threshold value α or greater (step S105=No), the three-dimensional object assessment unit 34 determines that another vehicle is not present in that a three-dimensional object is not present (step S115), cancels a warning when a warning is being issued (step S116), and thereafter returns to step S101 and repeats the above-described process.

On the other hand, when the peak in the first difference waveform $DW1_t$ is determined to be at a threshold value α or greater (step S105=Yes), the three-dimensional object assessment unit 34 determines that a three-dimensional object is present in the adjacent lane and proceeds to step S106.

In step S106, the first difference waveform $DW1_t$ is divided into a plurality of small areas $DW1_{t1}$ to $DW1_{tn}$ by the three-dimensional object detection unit 33. The three-dimensional object detection unit 33 next imparts weighting to each of the small areas $DW1_{t1}$ to $DW1_{tn}$, calculates the offset amount for each of the small areas $DW1_{t1}$ to $DW1_{tn}$ (step S107), and generates a histogram with consideration given to the weightings (step S108).

The three-dimensional object detection unit 33 calculates the relative movement distance, which is the movement distance of the adjacent vehicle in relation to the host vehicle, based on the histogram, and time-differentiates the calculated relative movement distance to thereby calculate the relative movement speed (step S109). The three-dimensional object detection unit 33 furthermore adds the host vehicle speed detected by the speed sensor 20 and calculates the relative movement speed of the adjacent vehicle (step S110).

In step S111, it is determined by the three-dimensional object assessment unit 34 whether the relative movement speed of the adjacent vehicle detected in step S109 is a negative value. When the relative movement speed of the adjacent vehicle is a negative value, i.e., when the relative movement speed of the adjacent vehicle is less than the movement speed of the host vehicle, it is determined that the host vehicle is attempting to pass the adjacent vehicle, and the process proceeds to step S201 illustrated in FIG. 13. On the other hand, when the relative movement speed of the adjacent vehicle is not a negative value, the process proceeds to step S112.

When it has been determined that the host vehicle is attempting to pass the adjacent vehicle (step S111=No), the three-dimensional object detection unit 33 counts the number of difference pixels DP having a pixel value of "1" along the vehicle width direction to thereby generate a second difference waveform $DW2_t$, as illustrated in FIG. 10 (step S201 in FIG. 13).

The three-dimensional object assessment unit 34 detects the number of detection positions in which the count number of difference pixels DP is at a threshold value s or greater, and determines whether a predetermined number or greater of the detection positions in which the count number is at a threshold value s or greater has been detected in continuous fashion (step S202). For example, when the predetermined number is set to "3," a predetermined number of the detection positions in which the count number is at a threshold value s or greater has been detected in continuous fashion in both the examples illustrated in FIGS. 11A and 11B. When a predetermined number or greater of the detection positions in which the count number is at a threshold value s or greater has occurred in continuous fashion (step S202=Yes), it is determined that an adjacent vehicle is present in the detection areas A1, A2 and the process proceeds to step S203. On the other hand, when it has not been detected that a predetermined number or greater of the detection positions in which the count number is at a threshold value s or greater has occurred in continuous fashion (step S202=No), the three-dimensional object assessment unit 34 determines that an adjacent vehicle is not present in the detection areas A1, A2, proceeds to step S115 illustrated in FIG. 12, and assesses that an adjacent vehicle to be detected is not present in the adjacent lane (step S115).

The three-dimensional object assessment unit 34 then determines whether the detection position $P_1$ nearest to the host vehicle among the detection positions for which the count number of the difference pixels DP is equal to or greater than the threshold value s has arrived at a predetermined position $P_0$ within the detection areas A1, A2 (step S203). When the detection position $P_1$ nearest to the host vehicle has not arrived at the predetermined position $P_0$ (step S203=No), it is determined that the host vehicle has not passed the adjacent vehicle, and the process proceeds to step S112 illustrated in FIG. 12. On the other hand, when the detection position $P_1$ nearest to the host vehicle has arrived at the predetermined position $P_0$ (step S203=Yes), the three-dimensional object assessment unit 34 determines that the host vehicle has passed the adjacent vehicle and there is no possibility that the host vehicle will contact the adjacent vehicle should a lane change be made. The process proceeds to step S115 illustrated in FIG. 12 and it is assessed that an adjacent vehicle to be detected is not present in the adjacent lane (step S115).

On the other hand, when it has been determined that the host vehicle is not attempting to pass an adjacent vehicle (step S111=No), the three-dimensional object assessment unit 34 determines whether the absolute movement speed of the adjacent vehicle is 10 km/h or more and whether the relative movement speed of the adjacent vehicle in relation to the host vehicle is +60 km/h or less (step S112). When both conditions are satisfied (step S112=Yes), the three-dimensional object assessment unit 34 determines that an adjacent vehicle to be detected is present in the adjacent lane (step S113), and causes the warning device 40 to issue a warning to the driver of the host vehicle so that the host vehicle does not make contact with the adjacent vehicle when a lane change is made (step S114). The process returns to step S101 with a warning still being issued, and the above-described process is repeated. On the other hand, when either one of the conditions is not satisfied (step S112=No), the three-dimensional object assessment unit 34 determines that an adjacent vehicle to be detected is not present in the adjacent lane (step S115), cancels the warning in the case that a warning is being issued (step S116), returns to step S101, and repeats the above-described process.

Thus, even when a warning has been issued when the host vehicle passes an adjacent vehicle traveling in an adjacent lane, in the present embodiment, when it has been determined that the detection position $P_1$ nearest to the host vehicle among the detection positions, for which the count number of the difference pixels DP is equal to or greater than the threshold value s, has arrived at a predetermined position $P_0$ within the detection areas A1, A2, and that the host vehicle has passed the adjacent vehicle (step S203=Yes), it is assessed that an adjacent vehicle to be detected is not present in the adjacent lane (step S115), and even were an adjacent vehicle to be present in the detection areas A1, A2, the warning is cancelled (step S116). Annoyance imparted by the warning to the driver of the host vehicle can thereby be reduced in the present embodiment when the host vehicle passes an adjacent vehicle. In step S114, the method for issuing a warning is not particularly limited, and it is possible, e.g., to have a warning sound outputted to the driver by the warning device 40 or to present a warning indication.

In the present embodiment, the detection areas A1, A2 are the rearward side directions of the host vehicle, and focus is placed on whether the host vehicle may possibly make contact with an adjacent vehicle should a lane change be made. Accordingly, the process of step S112 is implemented. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would be positioned ahead of the host vehicle when a lane change is made.

In step S112, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

Thus, in the first embodiment, two images obtained at different moments are converted to a bird's-eye view image, and a difference image $PD_t$ is generated based on the difference between the two bird's-eye view images. The number of pixels that indicate a predetermined difference in the difference image $PD_t$ data is counted along the direction in which the three-dimensional object collapses due to viewpoint conversion and a frequency distribution is formed to thereby generate a first difference waveform $DW1_t$ from the difference image $PD_t$ data. Furthermore, in the first embodiment, the number of pixels that indicate a predetermined difference in the difference image $PD_t$ data is counted and formed into a frequency distribution to thereby generate a second difference waveform $DW2_t$. In this case, counting the number of pixels that indicate a predetermined difference in the difference image $PD_t$ data along the vehicle width direction allows the front bumper of an adjacent vehicle present in the detection areas A1, A2 to be detected, and allows the position of the front bumper of the adjacent vehicle in the detection areas A1, A2 to be detected. In the present embodiment, as illustrated in FIG. 11B, when the detection position $P_1$ nearest to the host vehicle among the detection positions, for which the count number is equal to or greater than the threshold value s, has arrived at the predetermined position $P_0$ within the detection areas A1, A2, it is determined that the adjacent vehicle (the position of the front bumper of the adjacent vehicle) is far away from the host vehicle and that the host vehicle has passed the adjacent vehicle. It is thereby determined that an adjacent vehicle, with which the host vehicle may possibly make contact should a lane change be made, is not present, and it is assessed that an adjacent vehicle to be detected is not present in the adjacent lane. In this way, in the first embodiment, in an example situation in which a warning is being issued when the host vehicle passes an adjacent vehicle, the detection position $P_1$ nearest to the host vehicle among the detection positions, for which the count number is equal to or greater than the threshold value s, has arrived at a predetermined position $P_0$ within the detection areas A1, A2, and when it has been assessed that the host vehicle has passed the adjacent vehicle, it is assessed that an adjacent vehicle to be detected is not present in the adjacent lane, and the warning is cancelled even were an adjacent vehicle to be present in the detection areas A1, A2. Annoyance imparted by the warning to the driver of the host vehicle can thereby be reduced when the host vehicle passes an adjacent vehicle.

Embodiment 2

Figure 14:
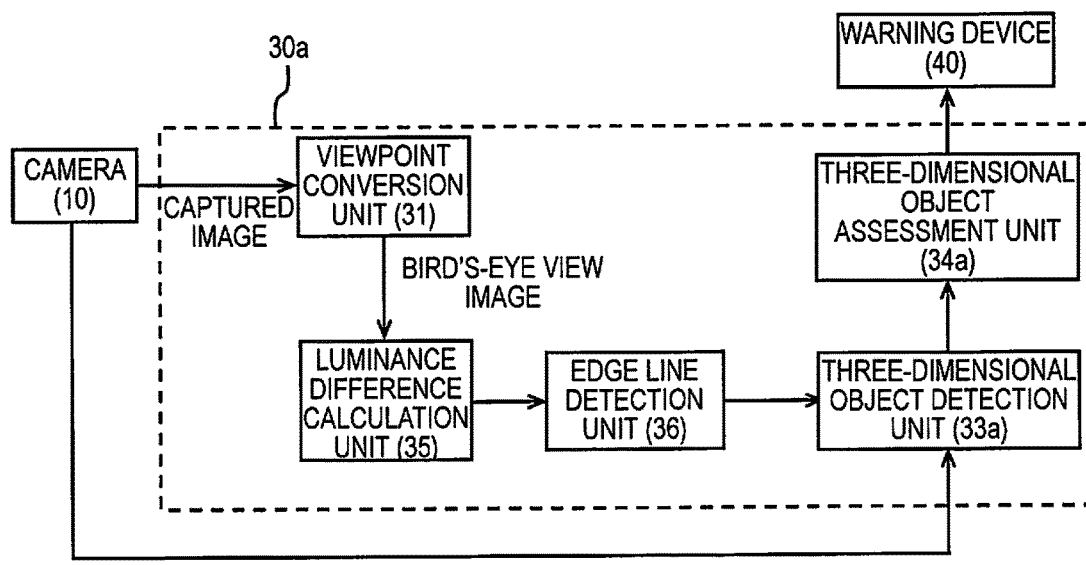
FIG. 14 is a block diagram illustrating the details of the computer according to the second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 14, and the operation is as described below. Here, FIG. 14 is a block view illustrating the details of the computer 30a according to the second embodiment.

The three-dimensional object detection device 1a according to the second embodiment is provided with a camera 10, a computer 30a, and a warning device 40, as illustrated in FIG. 14. The computer 30a is provided with a viewpoint conversion unit 31, a luminance difference calculation unit 35, an edge line detection unit 36, a three-dimensional object detection unit 33a, and a three-dimensional object assessment unit 34a. The configuration of the three-dimensional object detection device 1a according to the second embodiment is described below.

Figure 15:
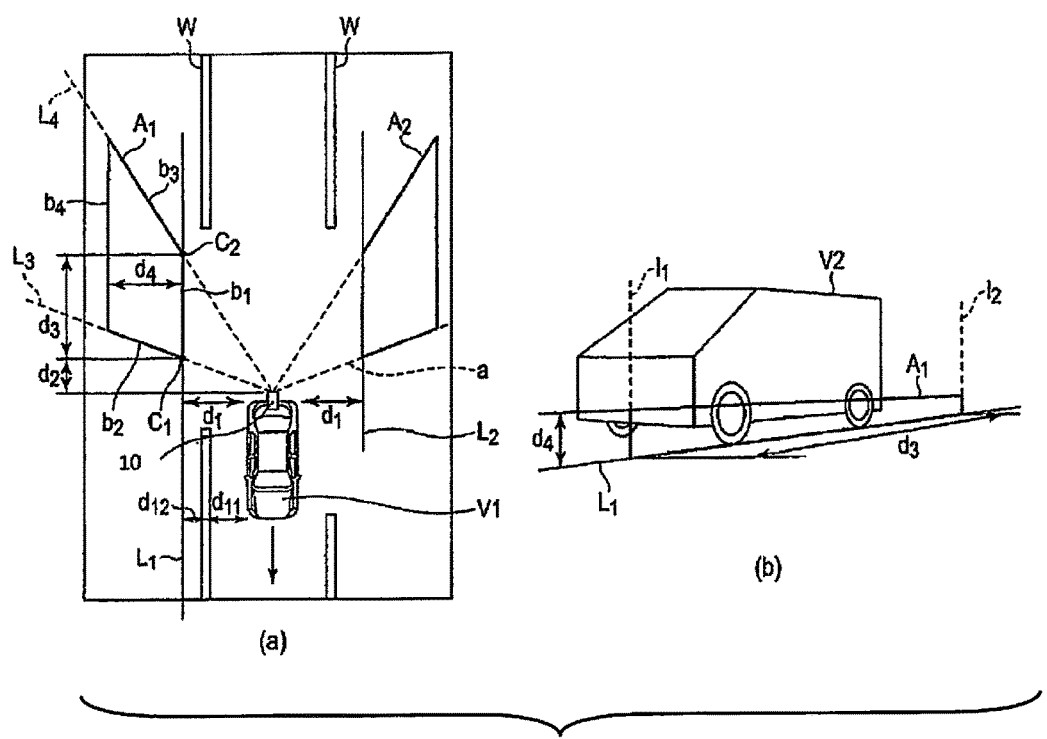
FIG. 15 is a view illustrating the travel state of the vehicle, with part (a) illustrating the positional relationship between the detection areas from a top plan view, and part (b) illustrating the positional relationship between the detection areas in real space from a perspective view.

FIG. 15 is a view illustrating the image range of the camera 10 in FIG. 14, with part (a) of FIG. 15 being a plan view, and part (b) of FIG. 15 being a perspective view in real space rearward from the host vehicle V1. The camera 10 is set to a predetermined view angle a, and the rearward side of the host vehicle V1 included in the predetermined view angle a is captured, as illustrated in part (a) of FIG. 15. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), and the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 15. In a bird's-eye view image, the distance d4 is the length illustrated in part (a) of FIG. 15. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 15.

Returning to FIG. 14, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 35 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 35 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 35 is described in detail below.

Figure 16:
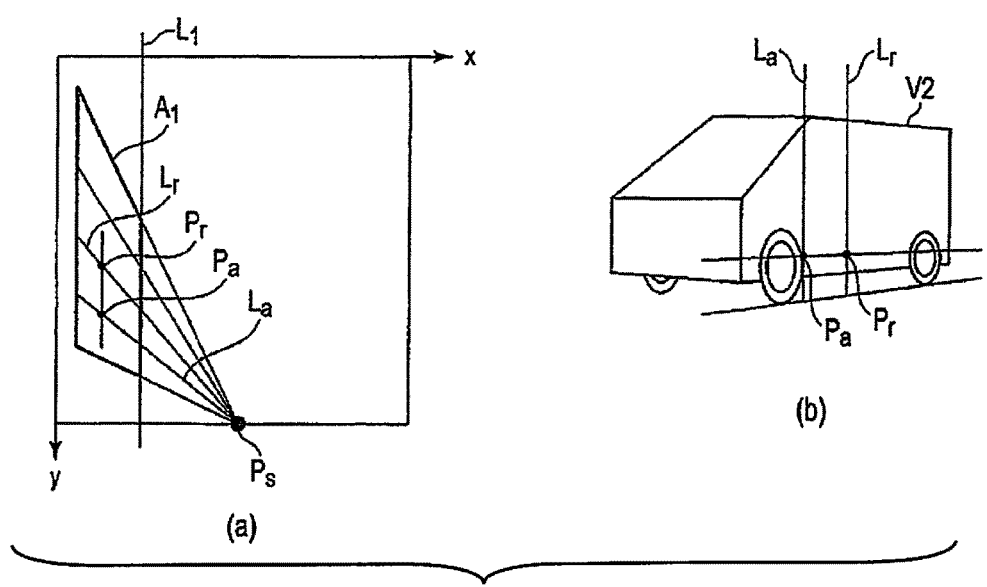
FIG. 16 is a view for describing the operation of the brightness difference calculation unit, with part (a) illustrating the position relationship between the attention line, reference line, attention point, and reference point in the bird's-eye view image, and part (b) illustrating the positional relationship between the attention line, reference line, attention point, and reference point in real space.

The luminance difference calculation unit 35 sets a first perpendicular imaginary line La (hereinbelow referred to as attention line La) that corresponds to a line segment extending in the perpendicular direction in real space and that passes through the detection area A1, as illustrated in part (a) of FIG. 16. The luminance difference calculation unit 35 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 35 sets an attention point Pa on the attention line La (a point on the first perpendicular imaginary line). The luminance difference calculation unit 35 sets a reference point Pr on the reference line Lr (a point on the second perpendicular imaginary line). The attention line La, the attention point Pa, the reference line Lr, and the reference point Pr have the relationship in real space illustrated in part (b) of FIG. 16. It is apparent from part (b) of FIG. 16 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 36 illustrated in FIG. 14 detects an edge line based on the luminance difference between the attention point Pa and the reference point Pr.

Figure 17:
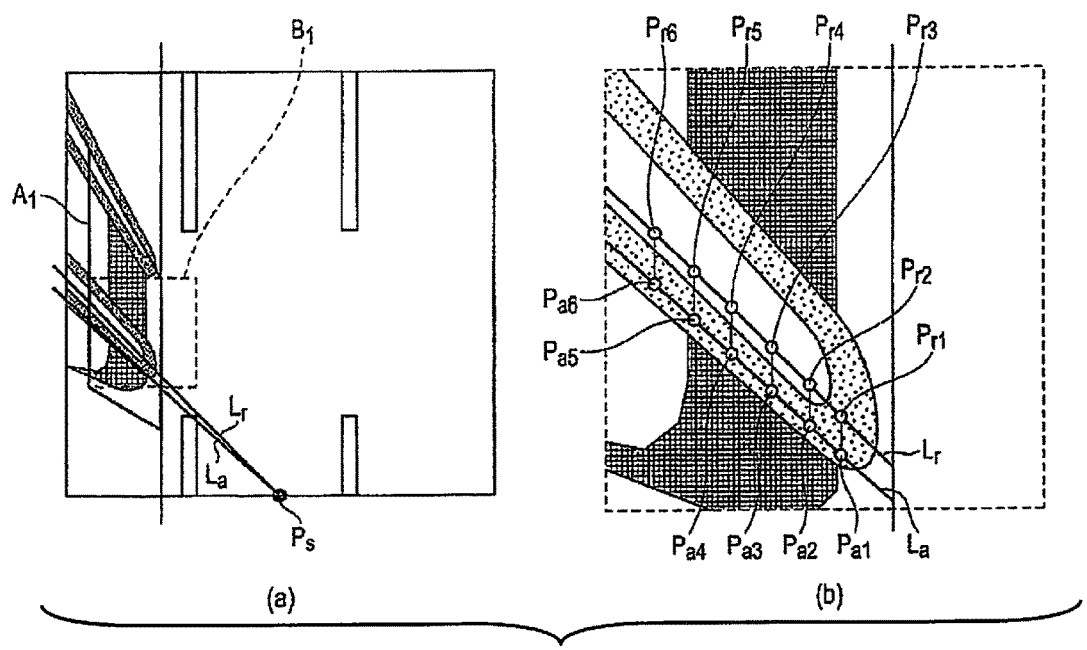
FIG. 17 is a view for describing the detailed operation of the luminance difference calculation unit, with part (a) illustrating the detection area in the bird's-eye view image, and part (b) illustrating the positional relationship between the attention line, reference line, attention point, and reference point in the bird's-eye view image.

This point will be described in greater detail. FIG. 17 is a view for describing the detailed operation of the luminance difference calculation unit 35. Part (a) of FIG. 17 illustrates a bird's-eye view image of the bird's-eye view state, and part (b) of FIG. 17 is an enlarged view of the bird's-eye view image illustrated in FIG. 17(a). In FIG. 17, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 17. The attention line La is set on a rubber portion of a tire of the adjacent vehicle V2 in the bird's-eye view image in part (b) of FIG. 17, as illustrated in the enlarged view of area B1 in part (a) of FIG. 17. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 35 sets a plurality of attention points Pa1 to PaN on the attention line La. In part (b) of FIG. 17, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of the plurality of positions (1-N) along the perpendicular imaginary line extending in the perpendicular direction in real space. The luminance difference calculation unit 35 calculates the luminance difference between, e.g., a first attention point Pa1 and a first reference point Pr1, and calculates the luminance difference between a second attention point Pa2 and a second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to $N^{th}$ attention points Pa3 to PaN and the third to $N^{th}$ reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 14, the edge line detection unit 36 detects the edge line from the continuous luminance difference calculated by the luminance difference calculation unit 35. For example, in the case illustrated in part (b) of FIG. 17, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 36 first assigns an attribute to the $i^{th}$ attention point Pai from the luminance difference between the $i^{th}$ attention point Pai (coordinates (xi, yi)) to the $i^{th}$ reference point Pri (coordinates (xi', yi')) in accordance with formula 1 noted below.

$s(xi,yi)=1$ when $I(xi, yi) > I(xi', yi') + t$ $s(xi,yi)=-1$ when $I(xi, yi) < I(xi', yi') - t$ $s(xi,yi)=0$            Formula 1 when the above do not hold true.

In formula 1 above, t represents a predetermined threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 36 assesses whether the attention line La is an edge line from the continuity c(xi, yi) of the attribute s along the attention line La based on the following formula 2.

$c(xi,yi)=1$ when $s(xi, yi)=s(xi+1, yi+1)$ (excluding when $0=0$)

$c(xi,yi)=0$            Formula 2 when the above does not hold true.

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to thereby normalize the continuity c. The edge line detection unit 36 determines the attention line La to be an edge line when the normalized value has exceeded a threshold value θ. The threshold value θ is set in advance by experimentation or other means.

In other words, the edge line detection unit 36 determines whether the attention line La is an edge line based on formula 3 noted below. The edge line detection unit 36 then determines whether all of the attention lines La drawn on the detection area A1 are edge lines.

$\Sigma c(xi,yi)/N > \theta$            Formula 3

Figure 18:
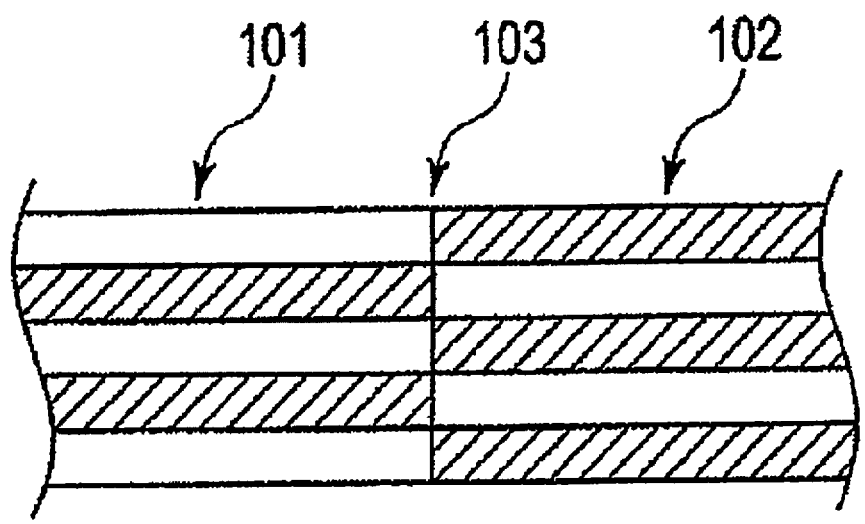
FIG. 18 is a view illustrating an image example for describing an edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 18 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 36 assesses the location 103 to be an edge line only when there is continuity in the attributes of the luminance difference. Therefore, the edge line detection unit 36 is capable of suppressing errant assessment in which the location 103, which is not recognized as an edge line by human senses, is recognized as an edge line, and edges can be detected in accordance with human senses.

Returning to FIG. 14, the three-dimensional object detection unit 33a detects a three-dimensional object based on the quantity of edge lines detected by the edge line detection unit 36. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 36. Specifically, the three-dimensional object detection unit 33a determines whether the quantity of edge lines detected by the edge line detection unit 36 is a predetermined threshold value β or greater, and when the quantity of edge lines is a predetermined threshold value β or greater, the edge lines detected by the edge line detection unit 36 are determined to be the edge lines of a three-dimensional object, and a three-dimensional object based on edge lines is thereby detected to be an adjacent vehicle V2.

Furthermore, prior to detecting the three-dimensional object, the three-dimensional object detection unit 33a assesses whether the edge lines detected by the edge line detection unit 36 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 19:
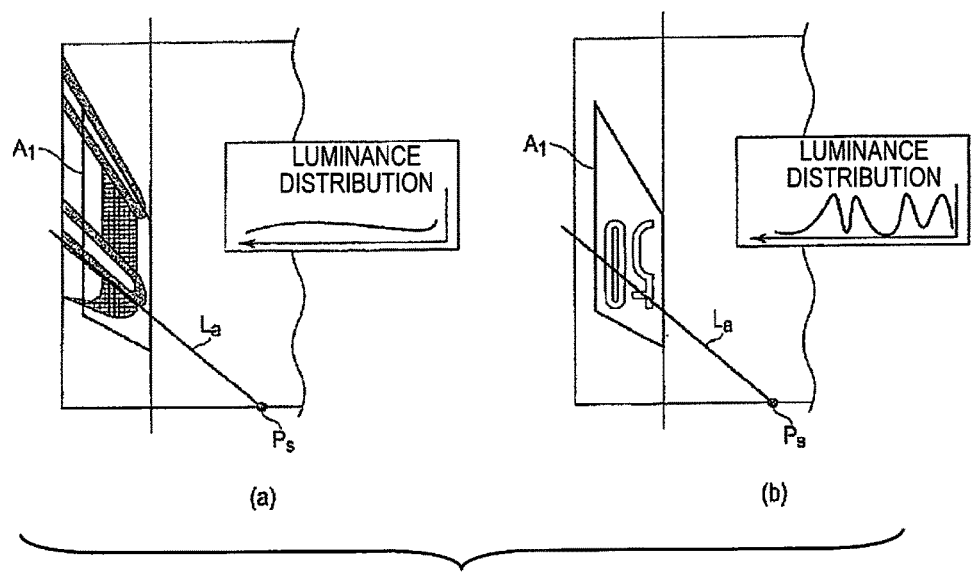
FIG. 19 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 19 is a view illustrating the luminance distribution on the edge line, with part (a) of FIG. 19(a) illustrating the edge line and the luminance distribution when an adjacent vehicle V2 as a three-dimensional object is present in the detection area A1, and part (b) of FIG. 19 illustrating the edge line and the luminance distribution when a three-dimensional object is not present in the detection area A1.

As illustrated in part (a) of FIG. 19, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 19. In this case, the change in luminance on the attention line La in the bird's-eye view image has considerable undulations. This is because the road and other portions of low luminance are mixed with the portions of high luminance in the white characters on the edge line.

The three-dimensional object assessment unit 34a assesses whether an edge line has been detected by errant assessment based on differences in the luminance distribution on the attention line La as described above. For example, a three-dimensional object included in a captured image tends to appear in an enlarged state in a bird's-eye view image when the captured image acquired by the camera 10 is converted to a bird's-eye view image. As described above, when the tire of an adjacent vehicle is enlarged, changes in the luminance of the bird's-eye view image in the enlarged direction tend to be small because the tire as a single location is enlarged. In contrast, when a character or the like drawn on the road surface has been errantly assessed to be an edge line, areas such as the character portion having high luminance and areas such as the road surface portion having low luminance are included in the bird's-eye view image in an intermixed fashion. In such a case, changes in luminance in the enlarged direction tend to be greater. Accordingly, the three-dimensional object detection unit 33a determines that the edge line has been detected by errant assessment when the change in luminance along the edge line is at a predetermined threshold value tb or greater, and determines that the edge line is not caused by a three-dimensional object. A reduction in precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the $i^{th}$ luminance value $I(xi, yi)$ and the adjacent $i^{th}+1$ luminance value $I(xi+1, yi+1)$ on the attention line La. Formula 5 evaluates the luminance distribution using the total value of the absolute value of the difference between the $i^{th}$ luminance value I(xi, yi) and the adjacent $i^{th}$+1 luminance value I(xi+1, yi+1) on the attention line La.

Evaluation value in perpendicular equivalent
direction=$\Sigma[\{I(xi,yi)-I(xi+1,yi+1)\}^2]$     Formula 4

Evaluation value in perpendicular equivalent
direction=$\Sigma |I(xi,yi)-I(xi+1,yi+1)|$     Formula 5

No limitation is imposed in the use of formula 5, and it is also possible to binarize an attribute b of an adjacent luminance value using a threshold value t2, and then sum the binarized attribute b for all of the attention points Pa, as in formula 6 noted below.

Evaluation value in perpendicular equivalent
direction=$\Sigma b(xi,yi)$     Formula 6 where b(xi, yi)=1 when |I(xi, yi)−I(xi+1, yi+1)|>t2
and b(xi, yi)=0
when the above does not hold true.

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

The three-dimensional object detection unit 33a detects the edge lines extending in the vehicle width direction from portions corresponding to the detection areas A1, A2, and generates a one-dimensional edge waveform $ED_t$. For example, the three-dimensional object detection unit 33a counts along the vehicle width direction the number of pixels corresponding to an edge line extending in the vehicle width direction to form a frequency distribution, and thereby generate a one-dimensional edge waveform $ED_t$, as illustrated in, e.g., FIG. 10. The three-dimensional object assessment unit 34a assesses whether the host vehicle has passed an adjacent vehicle based on the edge waveform $ED_t$ generated by the three-dimensional object detection unit 33a and thereby assesses an adjacent vehicle with which there is a possibility of contact should the host vehicle change lanes.

Thus, the edge waveform $ED_t$ is one mode of distribution information of pixels that indicate a predetermined luminance difference, and the "distribution information of pixels" in the present embodiment can be positioned with information indicating the state of distribution of "pixels having a luminance difference at a predetermined threshold value or greater" as detected along the vehicle width direction. In other words, the three-dimensional object detection unit 33a detects a three-dimensional object based on the distribution information of pixels having a luminance difference at a predetermined threshold value or greater along the vehicle width direction in a bird's-eye view image obtained by the viewpoint conversion unit 31.

Figure 20:
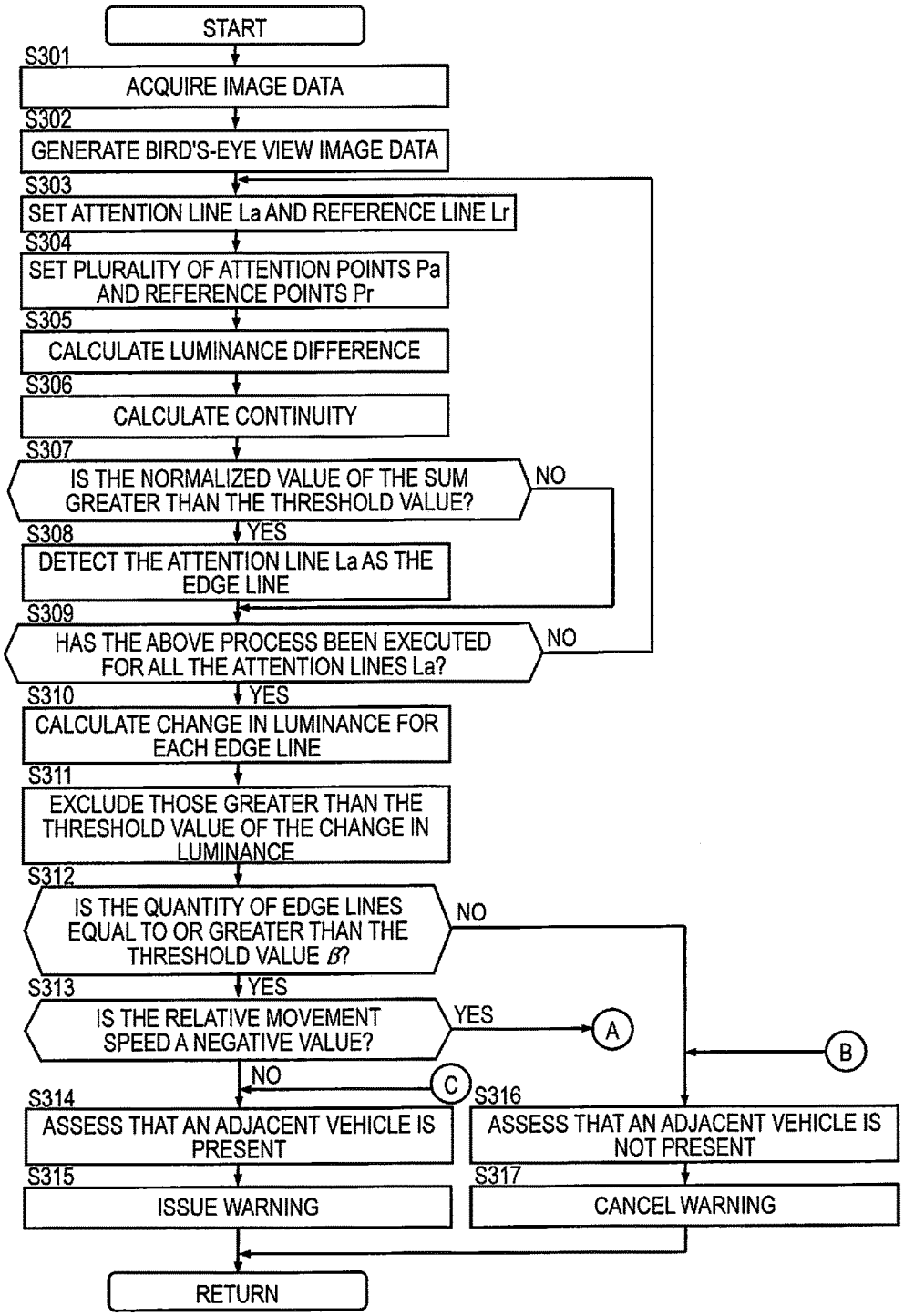
FIG. 20 is a first part of a flowchart illustrating the method for detecting an adjacent vehicle according to the second embodiment.

Next, the method for detecting an adjacent vehicle according to the second embodiment will be described. FIG. 20 is a flowchart illustrating the details of the method for detecting an adjacent vehicle according to the second embodiment. In FIG. 20, the process involved with detection area A1 will be described for the sake of convenience, but the same process is executed for the detection area A2 as well.

First, in step S301, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates bird's-eye view image data in step S302.

Next, in step S303, the luminance difference calculation unit 35 sets the attention line La on the detection area A1. At this time, the luminance difference calculation unit 35 sets a line corresponding to a line extending in the perpendicular direction in real space as the attention line La. Also, in step S303, the luminance difference calculation unit 35 also sets the reference line Lr on the detection area A1. The luminance difference calculation unit 35 sets, as the reference line Lr, a line that corresponds to a line extending in the perpendicular direction in real space, is the line also being separated by a predetermined distance in real space from the attention line La.

Next, in step S304, the luminance difference calculation unit 35 sets a plurality of attention points on the attention line La, and sets reference points Pr on the reference line Lr so that the attention points Pa and the reference points Pr are at substantially the same height in real space. The attention points Pa and the reference points Pr thereby line up in substantially the horizontal direction, and the edge line extending in the perpendicular direction in real space is more readily detected. Also, at this time, the luminance difference calculation unit 35 sets a certain number of attention points Pa that will not be problematic during edge detection by the edge line detection unit 36.

Next, in step S305, the luminance difference calculation unit 35 calculates the luminance difference between the attention points Pa and the reference points Pr at the same height in real space. The edge line detection unit 36 calculates the attribute s of the attention points Pa in accordance with formula 1 described above. In step S306, the edge line detection unit 36 then calculates the continuity c of the attribute s of the attention points Pa in accordance with formula 2. In step S307, the edge line detection unit 36 furthermore assesses whether a value obtained by normalizing the sum of the continuity c is greater than a threshold value θ in accordance with formula 3. When it has been determined that the normalized value is greater than the threshold value θ (step S307=Yes), the edge line detection unit 36 detects the attention line La as the edge line in step S308. The process then proceeds to step S309. When it has been determined that the normalized value is not greater than the threshold value θ (step S307=No), the edge line detection unit 36 does not detect that the attention line La is an edge line, and the process proceeds to step S309.

In step S309, the computer 30a determines whether the processes of steps S303 to S308 have been executed for all the attention lines La that can be set on the detection area A1. When it has been determined that the above processes have not been carried out for all the attention lines La (step S309=No), the process returns to step S303, sets a new attention line La, and repeats the process through step S309. On the other hand, when it has been determined that the processes have been carried out for all the attention lines La (step S309=Yes), the process proceeds to step S310.

In step S310, the three-dimensional object detection unit 33a calculates the change in luminance along the edge line for each edge line detected in step S308. The three-dimensional object detection unit 33*a* calculates the change in luminance of edge lines in accordance with any of formulas 4, 5, and 6. Next, in step S311, the three-dimensional object detection unit 33*a* excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33*a* determines an edge line having a change in luminance that is less than a predetermined threshold value tb to be an edge line of a three-dimensional object, and thereby detects the three-dimensional object present in an adjacent lane.

Next, in step S312, it is determined by the three-dimensional object assessment unit 34*a* whether the quantity of edge lines is a threshold value $\beta$ or higher. Here, the threshold value $\beta$ is set in advance to a value that allows a three-dimensional object to be assessed as a four-wheeled vehicle that appears in the detection areas A1, A2 based on the number of edge lines. When is has been assessed that the quantity of edge lines is not at a threshold value $\beta$ or higher (step S312=No), the three-dimensional object assessment unit 34*a* assesses in step S316 that an adjacent vehicle to be detected is not present in an adjacent lane, cancels a warning when a warning has been issued (step S317), and thereafter returns to step S301 and repeats the above-described process. On the other hand, when it has been assessed that the quantity of edge lines is at a threshold value $\beta$ or greater (step S312=Yes), the process proceeds to step S313.

Figure 21:
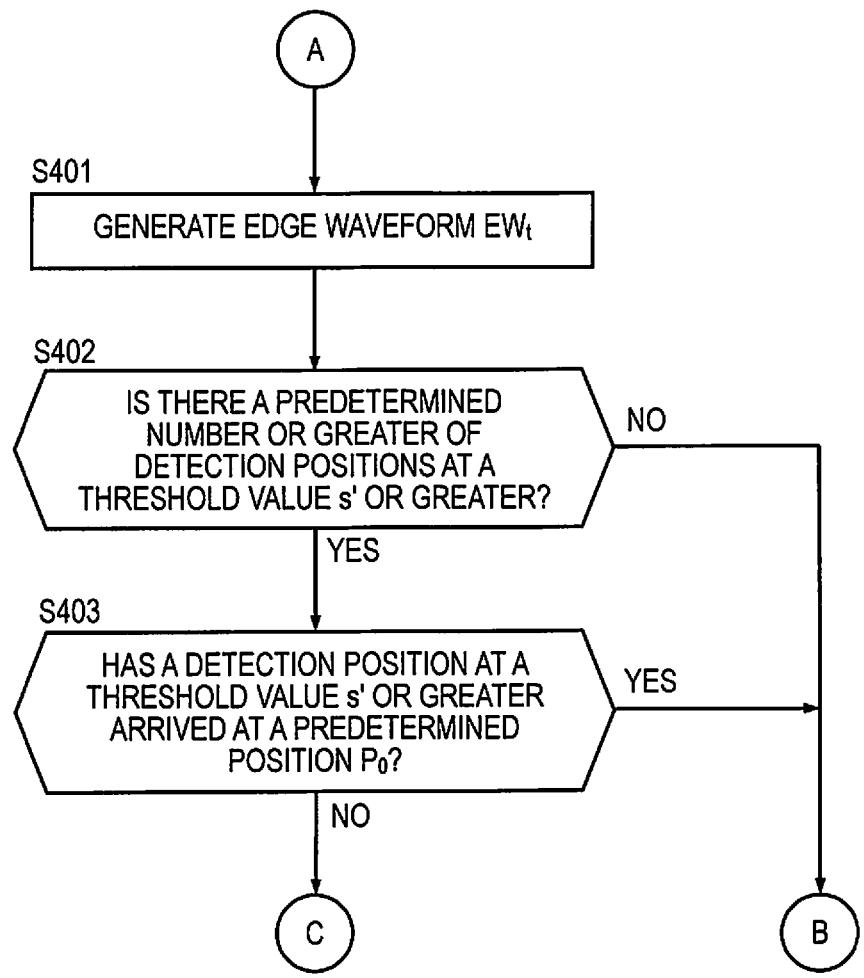
FIG. 21 is a second part of a flowchart illustrating the method for detecting an adjacent vehicle according to the second embodiment.

In step S313, it is determined by the three-dimensional object assessment unit 34*a* whether the relative movement speed of the adjacent vehicle is a negative value. For example, the three-dimensional object assessment unit 34*a* determines the relative movement speed of the adjacent vehicle based on the change in time of the edge lines, and when the relative movement speed of the adjacent vehicle is a negative value, i.e., when the movement speed of the adjacent vehicle in relation to the movement speed of the host vehicle is low, it is determined that the host vehicle is attempting to pass the adjacent vehicle, and the process proceeds to step S401 illustrated in FIG. 21. On the other hand, when the relative movement speed of the adjacent vehicle is not a negative value, it is determined that an adjacent vehicle to be detected is present in the adjacent lane (step S314), a warning is issued to the driver of the host vehicle (step S315), and the process then returns to step S301 and the above-described processing is repeated.

When it has been determined that the host vehicle is attempting to pass an adjacent vehicle (step S313=Yes), the three-dimensional object detection unit 33*a* detects edge lines extending in the vehicle width direction, and generates a one-dimensional edge waveform $EW_t$ based on the detected edge lines extending in the vehicle width direction (step S401), as illustrated in FIG. 10 of the first embodiment. For example, the three-dimensional object detection unit 33*a* counts the number of pixels corresponding to an edge line extending in the vehicle width direction to form a frequency distribution, as illustrated in FIG. 10, whereby a one-dimensional edge waveform $EW_t$ can be generated. The three-dimensional object assessment unit 34*a* then detects the number of detection positions in which the count number is at a threshold value s' or greater in the same manner as step S202 in the first embodiment, and when there is a continuity of a predetermined number or more of detection positions having a count number at the threshold value s' or greater (step S402=Yes), it is determined that an adjacent vehicle is present in the detection areas A1, A2 and the process proceeds to step S403. On the other hand, when a continuity of a predetermined number or more of detection positions having a count number at the threshold value s' or greater is not detected (step S402=No), it is assessed that an adjacent vehicle to be detected is not present in the adjacent lane (step S316 in FIG. 20). A warning is cancelled when a warning is being issued (step S317), and the process returns to step S301 and the above-described processing is repeated.

Next, in similar manner to step S203 in the first embodiment, the three-dimensional object assessment unit 34*a* determines whether a detection position $P_1$ nearest to the host vehicle among the detection positions for which the count number is equal to or greater than the threshold value s' has arrived at a predetermined position $P_0$ within the detection areas A1, A2. When the detection position $P_1$ nearest to the host vehicle has arrived at the predetermined position $P_0$ (step S403=Yes), it is determined that the host vehicle has passed the adjacent vehicle, it is determined that there is no possibility of contact with the adjacent vehicle should the host vehicle make a lane change, and it is assessed that an adjacent vehicle to be detected is not present in the adjacent lane (step S316 in FIG. 20). A warning is cancelled when a warning is being issued (step S317), and the process returns to step S301 and the above-described processing is repeated. On the other hand, when the detection position $P_1$ nearest to the host vehicle has not arrived at the predetermined position $P_0$ (step S403=No), it is determined that the host vehicle has not passed the adjacent vehicle and it is assessed that an adjacent vehicle to be detected is present in the adjacent lane (step S314 of FIG. 20). A warning is issued to the driver of the host vehicle (step S315), and the process returns to step S301 and the above-described processing is repeated.

As described above, in the second embodiment, the captured image is converted to a bird's-eye view image, and edge information of the three-dimensional object is detected from the bird's-eye view image thus converted. Edge lines extending in the vehicle width direction are detected, and the one-dimensional edge waveform $EW_t$ is generated based on the detected edge lines extending in the vehicle width direction. It is then assessed whether the host vehicle has passed the adjacent vehicle based on the generated one-dimensional edge waveform $EW_t$. In addition to the effects of the first embodiment, it is thereby possible in the second embodiment to suitably assess whether the host vehicle has passed the adjacent vehicle based on edge information, the adjacent vehicle passed by the host vehicle can be effectively prevented from being detected as an adjacent vehicle to be detected, and the precision for detecting an adjacent vehicle to be detected can be increased.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

For example, in the embodiments described above, an example configuration was given in which an adjacent vehicle to be detected is not assessed to be present in an adjacent lane when it has been assessed that the host vehicle has passed the adjacent vehicle travelling in an adjacent lane, but no limitation is imposed thereby, and, for example, it is also possible to use a configuration in which the degree of confidence for assessing an adjacent vehicle to be detected is reduced when it has been assessed that the host vehicle has passed an adjacent vehicle travelling in an adjacent lane.

In addition to the embodiments described above, in a situation in which a plurality of adjacent vehicles is present and the host vehicle is passing a plurality of adjacent vehicles, it is also possible to use a configuration in which an adjacent vehicle detected in front of new detection areas A1, A2 is made to be a new object of determination when another adjacent vehicle is detected in front of the detection areas A1, A2 before the detection position corresponding to one adjacent vehicle arrives at a predetermined position $P_0$ within the detection areas A1, A2.

Furthermore, in the first embodiment described above, an example configuration was given in which it is assessed, based on the change in time of the first difference waveform $DW1_t$, whether the host vehicle is attempting to pass an adjacent vehicle, as illustrated in step S111 of FIG. 12, but no limitation is imposed thereby, and it is also possible to use a configuration in which it is assessed, based on the change in time of the second difference waveform $DW2_t$, whether the host vehicle is passing an adjacent vehicle. For example, it is possible to use a configuration in which the relative movement speed of an adjacent vehicle is calculated based on the second difference waveform $DW2_t$ at the current moment and the second difference waveform $DW2_{t-1}$ at a single moment prior, and the host vehicle is assessed to be attempting to pass an adjacent vehicle when the relative movement speed of the adjacent vehicle is a negative value.

Furthermore, in the embodiments described above, a captured image of the current moment and an image at a single moment prior are converted to bird's-eye views, the converted bird's-eye views are aligned, a difference image $PD_t$ is then generated, and the generated difference image $PD_t$ is evaluated along the collapsing direction (the direction in which the three-dimensional object collapses when a captured image is converted to a bird's-eye view) to generate a first difference waveform $DW1_t$, but no limitation is imposed thereby. For example, it is also possible to use a configuration in which only the image at a single moment prior is converted to a bird's-eye view, the converted bird's-eye view is aligned, then converted again to a captured image equivalent, a difference image is generated using this image and the image at the current moment, and the generated difference image is evaluated along the direction corresponding to the collapsing direction (i.e., the direction obtained by converting the collapsing direction to a direction in the captured image) to thereby generate the first difference waveform $DW1_t$. In other words, a bird's-eye view is not expressly required to be generated as a necessity as long as the image at the current moment and the image at a single moment prior are aligned, a difference image $PD_t$ is generated from the difference between the two aligned images, and the difference image $PD_t$ can be evaluated along the collapsing direction of a three-dimensional object when the difference image $PD_t$ is converted to a bird's-eye view.

In the embodiments described above, the speed of the host vehicle V1 is determined based on a signal from the speed sensor 20, but no limitation is imposed thereby, and it is also possible to use a configuration in which the speed is estimated from a plurality of images at different moments. In this case, the speed sensor 20 is not required and the configuration can be simplified.

The camera 10 in the embodiments described above corresponds to the image capturing means of the present invention. The viewpoint conversion unit 31 corresponds to the image conversion means of the present invention, the alignment unit 32, the three-dimensional object detection unit 33, the luminance difference calculation unit 35, and the edge line detection unit 36 correspond to the three-dimensional object detection means of the present invention. The three-dimensional object assessment unit 34 corresponds to the three-dimensional object assessment means and the control means of the present invention.

$DW1_{t1}$ to $DW1_m$, $DW1_{m+k}$ to $DW1_n$ Small area
L1, L2: Ground line
La, Lb: Line in the direction in which the three-dimensional object collapses
La', Lb': Line in the vehicle width direction
P: Captured image
$PB_t$: Bird's-eye view image
$PD_t$: Difference image
V1: Host vehicle
V2: Adjacent vehicle
V3: Adjacent-adjacent vehicle

The invention claimed is:

1. A three-dimensional object detection device comprising:
    a camera arranged to capture images of a predetermined detection area with respect to a host vehicle equipped with the three-dimensional object detection device; and
    a computer;
    the computer being programmed to convert a viewpoint of the images obtained by the camera to create bird's-eye view images;
    the computer being programmed to detect a presence of a three-dimensional object within the predetermined detection area by vehicle width direction detection processing in which the bird's-eye view images obtained at different times are aligned, and vehicle width direction waveform information is generated by counting and creating a frequency distribution of a number of pixels along a vehicle width direction that indicate a predetermined difference in a difference image of the bird's-eye view images that were aligned to detect the presence of the three-dimensional object within the predetermined detection area;
    the computer being programmed to assess whether the detected three-dimensional object is another vehicle that is present within the predetermined detection area; and
    the computer being programmed to specify at least one detection position for which a count number equal to or greater than a predetermined value has been obtained in the vehicle width direction detection processing, and suppressing assessment that the three-dimensional object is another vehicle when the detection position that was specified has moved rearward within the predetermined detection area in a host vehicle progress direction and arrived at a predetermined position in the host vehicle progress direction within the predetermined detection area.

2. The three-dimensional object detection device according to claim 1, wherein
    the computer generates the vehicle width direction waveform information by using a plurality of different positions of the bird's-eye view images along the host vehicle progress direction in the predetermined detection area to form the frequency distribution, and the computer specifies a plurality of detection positions for which the count number equal to or greater than the predetermined value has been obtained in the vehicle width direction detection processing, and suppresses assessment that the three-dimensional object is another vehicle when the detection position nearest to the host vehicle among the plurality of detection positions has moved rearward within the predetermined detection area in the host vehicle progress direction and arrived at a predetermined position in the host vehicle progress direction within the predetermined detection area.

3. The three-dimensional object detection device according to claim 2, wherein the computer is further programmed to detect a presence of the three-dimensional object within the predetermined detection area by collapsing-direction detection processing based on generation of collapsing-direction waveform information by counting the number of pixels along a direction in which the three-dimensional object collapses when the viewpoint is converted to a bird's-eye view image that indicate a predetermined difference in a difference image of the aligned bird's-eye view images to form a frequency distribution.

4. The three-dimensional object detection device according to claim 3, wherein the computer calculates a relative movement speed of the three-dimensional object based on a change in time of one of the vehicle width direction waveform information and the collapsing-direction waveform information, and the computer determines whether the relative movement speed of the three-dimensional object is a passing speed that allows the host vehicle to pass the three-dimensional object, performs the vehicle width direction detection processing upon determining that the relative movement speed is the passing speed, and performs the collapsing-direction detection processing upon determining that the relative movement speed is not the passing speed.

5. The three-dimensional object detection device according to claim 1, wherein the computer is further programmed to detect a presence of the three-dimensional object within the predetermined detection area by collapsing-direction detection processing based on generation of collapsing-direction waveform information by counting the number of pixels along a direction in which the three-dimensional object collapses when the viewpoint is converted to a bird's-eye view image that indicate a predetermined difference in a difference image of the aligned bird's-eye view images to form a frequency distribution.

6. The three-dimensional object detection device according to claim 5, wherein the computer calculates a relative movement speed of the three-dimensional object based on a change in time of one of the vehicle width direction waveform information and the collapsing-direction waveform information, and the computer determines whether the relative movement speed of the three-dimensional object is a passing speed that allows the host vehicle to pass the three-dimensional object, performs the vehicle width direction detection processing upon determining that the relative movement speed is the passing speed, and performs the collapsing-direction detection processing upon determining that the relative movement speed is not the passing speed.

7. A three-dimensional object detection device comprising:

a camera arranged to capture images of a predetermined detection area with respect to a host vehicle equipped with the three-dimensional object detection device; and a computer;

the computer being programmed to convert a viewpoint of the images obtained by the camera to create bird's-eye view images;

the computer being programmed to detect a presence of a three-dimensional object within the predetermined detection area by vehicle width direction detection processing based on edge information detected along a vehicle width direction from the bird's-eye view images obtained by the camera;

the computer being programmed to assess the detected three-dimensional object is another vehicle that is present within the predetermined detection area; and the computer being programmed to specify at least one detection position for which a count number equal to or greater than a predetermined value has been obtained in the vehicle width direction detection processing, and suppressing assessment that the three-dimensional object is another vehicle when the detection position that was specified has moved rearward within the predetermined detection area in a host vehicle progress direction and arrived at a predetermined position in the host vehicle progress direction within the predetermined detection area.

8. The three-dimensional object detection device according to claim 7, wherein the computer, when carrying out the vehicle width direction detection processing, detects the edge information along the vehicle width direction from the bird's-eye view images in a plurality of different positions along the host vehicle progress direction in the predetermined detection area, and the computer programmed to specify a plurality of detection positions for which a count number equal to or greater than a predetermined value has been obtained in the vehicle width direction detection processing, and suppresses assessment that the three-dimensional object is another vehicle when the detection position nearest to the host vehicle among the plurality of specified detection positions has moved rearward within the predetermined detection area in the host vehicle progress direction and arrived at a predetermined position in the host vehicle progress direction within the predetermined detection area.

9. The three-dimensional object detection device according to claim 8, wherein the computer is further programmed to detect a presence of the three-dimensional object within the predetermined detection area by collapsing-direction detection processing based on detection of the edge information along a direction in which a three-dimensional object collapses when the viewpoint is converted to a bird's-eye view image.

10. The three-dimensional object detection device according to claim 9, wherein the computer calculates a relative movement speed of the three-dimensional object based on a change in time of the edge information, and the computer determines whether the relative movement speed of the three-dimensional object is a passing speed that allows the host vehicle to pass the three-dimensional object, performs the vehicle width direction detection processing upon determining that the relative movement speed is the passing speed, and performs the collapsing-direction detection processing upon determining that the relative movement speed is not the passing speed.

11. The three-dimensional object detection device according to claim 7, wherein
the computer is further programmed to detect a presence of the three-dimensional object within the predetermined detection area by collapsing-direction detection processing based on detection of the edge information along a direction in which a three-dimensional object collapses when the viewpoint is converted to a bird's-eye view image.

12. The three-dimensional object detection device according to claim 11, wherein
the computer calculates a relative movement speed of the three-dimensional object based on a change in time of the edge information, and
the computer determines whether the relative movement speed of the three-dimensional object is a passing speed that allows the host vehicle to pass the three-dimensional object, performs the vehicle width direction detection processing upon determining that the relative movement speed is the passing speed, and performs the collapsing-direction detection processing upon determining that the relative movement speed is not the passing speed.

13. A three-dimensional object detection device characterized by comprising:
a camera arranged to capture an image of a predetermined detection area with respect to a host vehicle equipped with the three-dimensional object detection device; and
a computer;
the computer being programmed to convert a viewpoint of the image obtained by the camera to create a bird's-eye view image;
the computer being programmed to detect a presence of a three-dimensional object within the predetermined detection area by vehicle width direction detection processing based on distribution information of pixels in which a luminance difference is at a predetermined threshold value or greater along a vehicle width direction in the bird's-eye view images;
the computer being programmed to assess whether the detected three-dimensional object is another vehicle to be detected that is present within the predetermined detection area; and
the computer being programmed to specify at least one detection position for which a count number equal to or greater than a predetermined value has been obtained in the vehicle width direction detection processing, and suppressing assessment that the three-dimensional object is another vehicle to be detected when the specified detection position has moved within the predetermined detection area from the front toward the back in a host vehicle progress direction and arrived at a predetermined position in the host vehicle progress direction within the predetermined detection area.

* * * * *